United States Patent
Hikitani et al.

(10) Patent No.: US 10,876,465 B2
(45) Date of Patent: Dec. 29, 2020

(54) INTAKE-AIR TEMPERATURE CONTROLLING DEVICE FOR ENGINE WITH SUPERCHARGER

(71) Applicant: Mazda Motor Corporation, Hiroshima (JP)

(72) Inventors: Shinichi Hikitani, Hiroshima (JP);
Hajime Umehara, Hiroshima (JP);
Naoki Nagano, Hiroshima (JP);
Tomokuni Kusunoki, Aki-gun (JP);
Shinji Takayama, Hiroshima (JP);
Masanobu Koutoku, Hiroshima (JP);
Toshinori Ueno, Higashihiroshima (JP);
Katsuya Murakami, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/676,735

(22) Filed: Nov. 7, 2019

(65) Prior Publication Data
US 2020/0208567 A1 Jul. 2, 2020

(30) Foreign Application Priority Data
Dec. 26, 2018 (JP) ................ 2018-241940

(51) Int. Cl.
*F02B 29/04* (2006.01)
(52) U.S. Cl.
CPC ...... *F02B 29/0493* (2013.01); *F02B 29/0406* (2013.01); *F02B 29/0475* (2013.01)
(58) Field of Classification Search
CPC .............. F02B 29/0406; F02B 29/0443; F02B 29/0475; F02B 29/0493; F02B 39/16; F02D 41/0007; F02D 41/3041; F02M 31/042; F02M 31/16; Y02T 10/12
See application file for complete search history.

(56) References Cited

U.S. PATENT DOCUMENTS

| | | | | |
|---|---|---|---|---|
| 6,457,460 B1 * | 10/2002 | Doane | ........... | F02M 31/20 123/541 |
| 8,646,419 B2 * | 2/2014 | Kamiyama | ........ | F02D 13/0269 123/48 R |
| 2003/0015183 A1* | 1/2003 | Sealy | ........... | F02B 33/446 123/563 |

FOREIGN PATENT DOCUMENTS

JP          3564989 B2    6/2004

* cited by examiner

*Primary Examiner* — Jesse S Bogue
(74) *Attorney, Agent, or Firm* — Alleman Hall Creasman & Tuttle LLP

(57) ABSTRACT

An intake-air temperature controlling device is provided, which includes an engine body, an intake passage, a supercharger, a first passage, a second passage, an intake air flow rate adjuster, an intercooler, a pump, and a controller. The controller outputs a control signal to the pump so that coolant is supplied to the intercooler in a first operating range in which the intake air flow rate adjuster at least partially opens the first passage to supply intake air boosted by the supercharger to the engine body, and outputs a control signal to the pump so that the coolant is supplied to the intercooler also in a second operating range in which an engine load is below a given load, and the intake air flow rate adjuster opens the second passage and closes the first passage to supply the intake air to the engine body in a non-boosted state.

5 Claims, 13 Drawing Sheets

INTAKE-AIR TEMPERATURE CONTROLLING DEVICE FOR ENGINE WITH SUPERCHARGER

TECHNICAL FIELD

The technology disclosed herein belongs to a technical field related to an intake-air temperature controlling device for an engine with a supercharger.

BACKGROUND OF THE DISCLOSURE

Conventionally, the engine with the supercharger in which a mechanical supercharger is provided in an intake passage is known.

For example, JP3564989B2 discloses a boosted engine provided with a mechanical supercharger which intervenes in the intake passage, an intercooler provided downstream of the mechanical supercharger, a clutch which intercepts and permits the transfer of a driving force to the mechanical supercharger, and an air bypass passage which bypasses the mechanical supercharger. The boosted engine disclosed in JP3564989B2 (hereinafter, simply referred to as "the boosted engine") turns off the clutch to make the mechanical supercharger into a non-driving state, and opens the air bypass passage, when an operating range of the boosted engine is in a low-load low-speed range. Moreover, when the operating range of the boosted engine is in a high-load range, the boosted engine turns on the clutch and permits the driving force to transmit to the mechanical supercharger, and closes the air bypass passage.

Meanwhile, when the mechanical supercharger is driven to boost the intake air like the boosted engine, the coolant is normally circulated to the intercooler to cool the boosted intake air. Therefore, excessively hot intake air immediately after being boosted can be prevent from being supplied to the engine body.

Here, for example, during an acceleration of a vehicle, the engine load becomes high from low. At this time, the boosted engine transitions to the boosted state from the non-boosted state. Therefore, during the transition of the engine load to high from low, it is necessary to permit the coolant to circulate through the intercooler to cool the boosted intake air. However, if the supply of the coolant to the intercooler is started at the moment when the engine load becomes high, a suitable flow rate of the coolant cannot be supplied to the intercooler, and therefore, the response becomes slower.

If the cooling of the intake air by the intercooler cannot be performed appropriately, the excessively hot intake air immediately after being boosted is supplied to the engine body, thereby causing abnormal combustion, such as a premature ignition of the fuel at an unexpected timing, and a knock. Therefore, when the operating range changes from an operating range in which the non-boosted intake air is supplied to the engine body to an operating range in which the boosted intake air is supplied to the engine body, there is room for improvement in terms of reducing an occurrence of abnormal combustion.

SUMMARY OF THE DISCLOSURE

The technology disclosed herein is made in view of the situation, and one purpose thereof is to reduce an occurrence of abnormal combustion, when an operating state of an engine body shifts from an operating range in which non-boosted intake air is supplied to the engine body to an operating range in which boosted intake air is supplied to the engine body.

According to one aspect of the present disclosure, an intake-air temperature controlling device is provided. The device includes an engine body, an intake passage connected to the engine body, a supercharger provided to the intake passage, a first passage provided to the intake passage and including a compressor of the supercharger, a second passage provided to the intake passage, communicating with the first passage at a location at least downstream of the supercharger, and not provided with the supercharger, an intake air flow rate adjuster configured to adjust a ratio of an amount of intake air passing through the first passage to an amount of intake air passing through the second passage, an intercooler provided to the first passage at a location immediately downstream of the supercharger, a pump configured to supply coolant to the intercooler, and a controller comprised of circuitry and configured to control the pump and the intake air flow rate adjuster. The controller outputs a control signal to the pump so that the coolant is supplied to the intercooler in a first operating range in which the intake air flow rate adjuster at least partially opens the first passage to supply the intake air boosted by the supercharger to the engine body, and outputs a control signal to the pump so that the coolant is supplied to the intercooler also in a second operating range in which a load of the engine body is below a given load, the intake air flow rate adjuster opens the second passage and closes the first passage to supply the intake air to the engine body in a non-boosted state.

According to this configuration, since the coolant is supplied to the intercooler even in the second operating range in which the non-boosted intake air is supplied to the engine body, when shifted to the first operating range in which the boosted intake air is supplied to the engine body, the intake air boosted by the supercharger can be cooled by the intercooler with a sufficient response. Therefore, when the operating state of the engine body goes into the operating range in which the boosted intake air is supplied to the engine body (hereinafter, referred to as "the boosted range") from the operating range in which the non-boosted intake air is supplied to the engine body (hereinafter, referred to as "the non-boosted range"), excessively hot intake air can be prevented from being supplied to the engine body. As a result, when the operating state of the engine body goes into the boosted range from the non-boosted range, abnormal combustion can be prevented from occurring.

The pump may be an electric pump configured to increase a discharging amount of the coolant as supplied electric power increases. The controller may output a control signal to the pump so that a flow rate of the coolant supplied to the intercooler per unit time in the second operating range becomes less than a flow rate of the coolant supplied to the intercooler per unit time in the first operating range.

According to this configuration, the power consumption for operating the pump can be reduced. On the other hand, when the operating state of the engine body goes into the boosted range from the non-boosted range, only increasing the flow rate of the coolant supplied to the intercooler per unit time is required, and thus, the response of cooling the intake air by the intercooler can be improved.

The first operating range may be an operating range in which the load of the engine body is higher than the given load. The intake air flow rate adjuster may close the second passage and open the first passage in the first operating range to supply the intake air boosted by the supercharger to the engine body.

That is, when the load of the engine body is high, it is necessary to supply the intake air (especially, fresh air) as much as possible to the engine body, and to positively boost the intake air by the supercharger. Moreover, the load of the engine body is high, it is required to increase the density of the intake air. Thus, the high response to the cooling of the intake air by the intercooler is required. Therefore, when the operating state of the engine body goes into the boosted range from the non-boosted range, the effect of reducing the occurrence of abnormal combustion can be demonstrated more appropriately.

A combustion mode of the engine body when the load of the engine body is higher than the given load may be a combined mode of spark ignition (SI) combustion in which jump-spark ignition of a mixture gas comprised of fuel and the intake air is carried out by an ignition plug and compression ignition (CI) combustion in which a compression self-ignition of the mixture gas comprised of fuel and the intake air is carried out.

That is, when the operating state of the engine body enters the boosted range from the non-boosted range, in order to reduce the occurrence of abnormal combustion, it is desirable to control a combustion timing of fuel (e.g., a timing of combustion peak) when the operating state of the engine body is in the boosted range (i.e., the load of the engine body is high). In the combustion mode combining SI combustion and CI combustion, by executing the ignition by the ignition plug ahead of CI combustion, the occurrence timing of CI combustion can be controlled. Moreover, when the operating state of the engine body goes into the boosted range from the non-boosted range, since excessively hot intake air is prevented from being supplied to the engine body, CI combustion does not occur at a moment of igniting by the ignition plug. Thus, the occurrence of abnormal combustion can be further effectively reduced when the operating state of the engine body goes into the boosted range from the non-boosted range.

The second passage may be a bypass passage connecting a part of the first passage upstream of the supercharger and a part of the first passage downstream of the intercooler. A temperature of the intake air supplied to the engine body in the second operating range may be higher than a temperature of the intake air supplied to the engine body in the first operating range.

According to this configuration, when the operating state of the engine body is in the second operating range, the intake air mainly passes through the bypass passage. At this time, since the first passage is heated by the heat transfer from the bypass passage (the second passage), the air inside the first passage is also heated. In this regard, when the operating state of the engine body is in the second operating range, the air inside the first passage can be prevented from being heated by supplying the intercooler coolant to the intercooler. Therefore, the occurrence of abnormal combustion can be further effectively reduced when the operating state of the engine body goes into the boosted range from the non-boosted range.

A geometric compression ratio of the engine body may be 13:1 or higher.

According to this configuration, when the geometric compression ratio of the engine body is comparatively high, such as 13:1 or higher, it tends to acquire high combustion torque, but it is easy to cause abnormal combustion. Therefore, by supplying the intercooler coolant to the intercooler also when the operating state of the engine body is in the second operating range (the non-boosted range), the effect of reducing the occurrence of abnormal combustion when the operating state of the engine body goes into the boosted range from the non-boosted range, can be demonstrated further appropriately.

DETAILED DESCRIPTION OF THE DISCLOSURE

Hereinafter, exemplary embodiments are described in detail with reference to the accompanying drawings.

Embodiment 1

Figure 1:
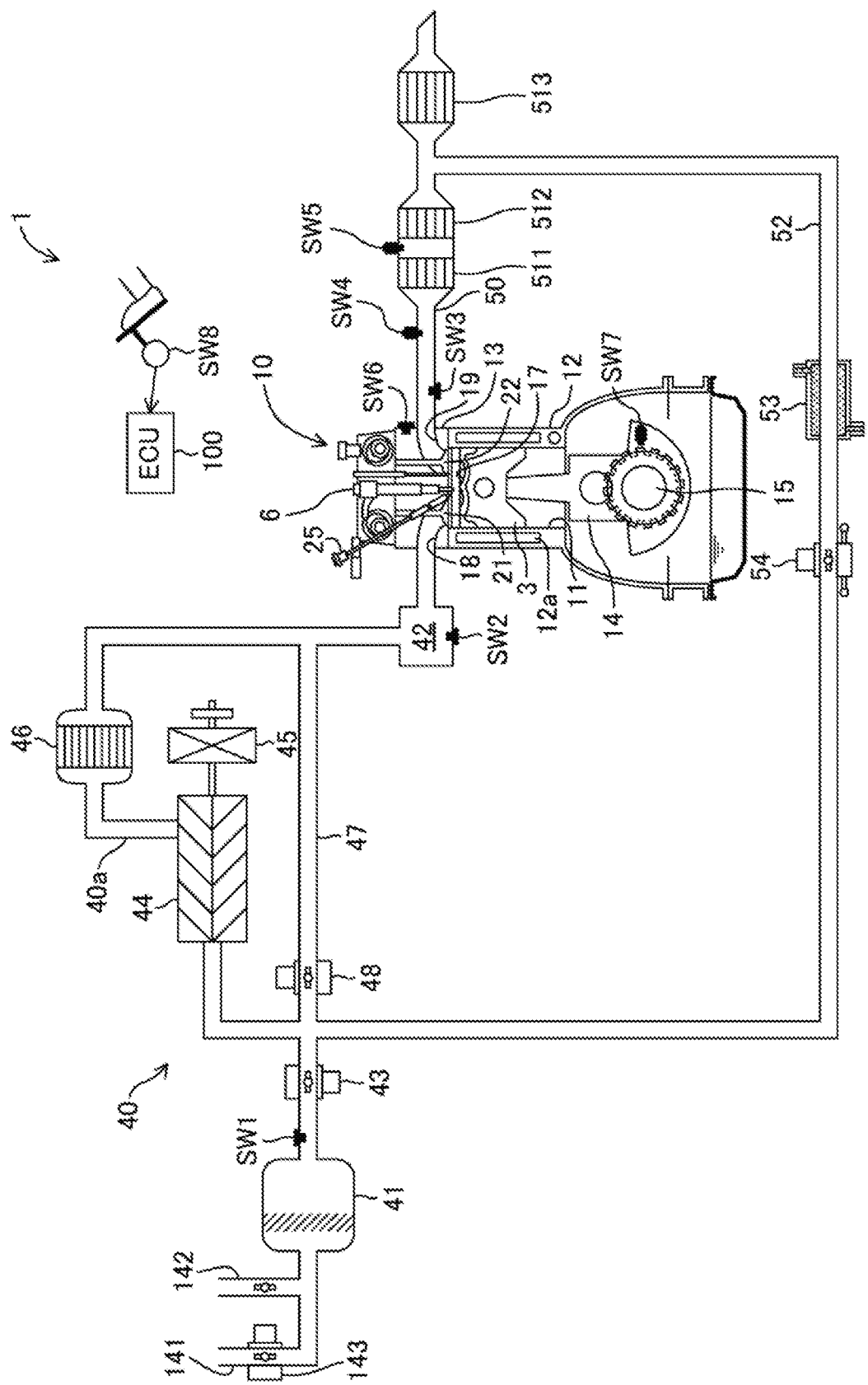
FIG. 1 is an outline configuration view of an engine provided with an intake-air temperature controlling device according to an Embodiment 1.

FIG. 1 illustrates a configuration of an engine 1 with a supercharger, to which an intake-air temperature controlling device according to Embodiment 1 is applied (hereinafter, simply referred to as "the engine 1"). The engine 1 is a four-stroke engine which operates by a combustion chamber 17 repeating an intake stroke, a compression stroke, an expansion stroke, and an exhaust stroke. The engine 1 is mounted on a vehicle (here, an automobile) with four wheels. The vehicle is propelled by the engine 1. Fuel of the engine 1 is liquid fuel of which the main component is gasoline in this configuration example.

(Configuration of Engine)

The engine 1 is provided with an engine body 10 having a cylinder block 12 and a cylinder head 13 placed thereon. The engine body 10 is a multi-cylinder engine in which a plurality of cylinders 11 are formed inside the cylinder block 12. In FIG. 1, only one cylinder 11 is illustrated. Other cylinders 11 of the engine body 10 are lined up in a direction perpendicular to the drawing sheet surface of FIG. 1.

A piston 3 is slidably inserted in each cylinder 11. The piston 3 is coupled to a crankshaft 15 through a connecting rod 14. The piston 3 defines the combustion chamber 17 together with the cylinder 11 and the cylinder head 13. Note that the "combustion chamber" is not limited to a space thereof when the piston 3 is located at a compression top dead center. Therefore, the term "combustion chamber" may be used in a broader sense. That is, the "combustion chamber" may mean the space formed by the piston 3, the cylinder 11, and the cylinder head 13, regardless of the position of the piston 3.

A water jacket 12a is formed in the perimeter of each cylinder 11 in the cylinder block 12. Engine coolant which cools the engine body 10 circulates inside the water jacket 12a. Although detailed illustration is omitted, after passing through the water jacket 12a, the engine coolant passes through a water jacket formed in the cylinder head 13, and flows out of the engine body 10.

An intake port 18 is formed in the cylinder head 13 for every cylinder 11. The intake port 18 communicates with the combustion chamber 17. An intake valve 21 is disposed in the intake port 18. The intake valve 21 opens and closes an intake passage between the combustion chamber 17 and the intake port 18. The intake valve 21 is opened and closed at a given timing by a valve operating mechanism. The valve operating mechanism may be a variable valve operating mechanism which varies a valve timing and/or a valve lift. In this embodiment, the variable valve operating mechanism has an intake electric S-VT (Sequential-Valve Timing) 23 (refer to FIG. 6). The intake electric S-VT 23 is configured to continuously change a rotation phase of an intake cam shaft within a given angle range. Therefore, an open timing and a close timing of the intake valve 21 are continuously changed. Note that the intake valve operating mechanism may have a hydraulic S-VT, instead of the electric S-VT.

An exhaust port 19 is formed in the cylinder head 13 for every cylinder 11. The exhaust port 19 communicates with the combustion chamber 17. An exhaust valve 22 is disposed in the exhaust port 19. The exhaust valve 22 opens and closes an exhaust passage between the combustion chamber 17 and the exhaust port 19. By the valve operating mechanism, the exhaust valve 22 is opened and closed at a given timing. This valve operating mechanism may be a variable valve operating mechanism which varies a valve timing and/or a valve lift. In this embodiment, the variable valve operating mechanism has an exhaust electric S-VT 24 (refer to FIG. 6). The exhaust electric S-VT 24 is configured to continuously change a rotation phase of an exhaust cam shaft within a given angle range. Thus, an open timing and a close timing of the exhaust valve 22 are changed continuously. Note that the exhaust valve operating mechanism may have a hydraulic S-VT, instead of the electric S-VT.

An injector 6 which directly injects fuel into the cylinder 11 is attached to the cylinder head 13 for every cylinder 11. The injector 6 is disposed so that its nozzle holes face the combustion chamber 17 from a center part of a ceiling surface of the combustion chamber 17 (in detail, a part slightly at the exhaust side from the center). The injector 6 directly injects an amount of fuel according to the operating state of the engine body 10 into the combustion chamber 17 at an injection timing set according to the operating state of the engine body 10.

An ignition plug 25 is attached to the cylinder head 13 for every cylinder 11. The ignition plug 25 forcibly ignites a mixture gas inside the combustion chamber 17. In this embodiment, the ignition plug 25 is disposed at the intake side. Electrodes of the ignition plug 25 face the inside of the combustion chamber 17, and are located near the ceiling surface of the combustion chamber 17. Note that the ignition plug 25 may be disposed at the exhaust side. Moreover, while disposing the ignition plug 25 on the center axis of the cylinder 11, the injector 6 may be disposed at the intake side or the exhaust side of the center axis of the cylinder 11.

In this embodiment, the geometric compression ratio of the engine body 10 is set as 13:1 or more and 30:1 or less. As will be described later, in the entire operating range after a warm-up of the engine 1, the engine 1 performs SPCCI (SPark Controlled Compression Ignition) combustion which is a combination of SI (Spark Ignition) combustion in which the mixture gas of fuel and intake air is ignited by jump-spark ignition by the ignition plug 25 and CI (Compression Ignition) combustion in which the mixture gas of fuel and intake air is ignited by compression self-ignition. SPCCI combustion controls CI combustion by utilizing a generation of heat and a pressure buildup by SI combustion. The geometric compression ratio of the engine 1 may be set as 14:1 to 17:1 in a regular gasoline specification (the octane number of fuel is about 91), and may also be set as 15:1 to 18:1 in a high-octane specification (the octane number of fuel is about 96).

Figure 4:
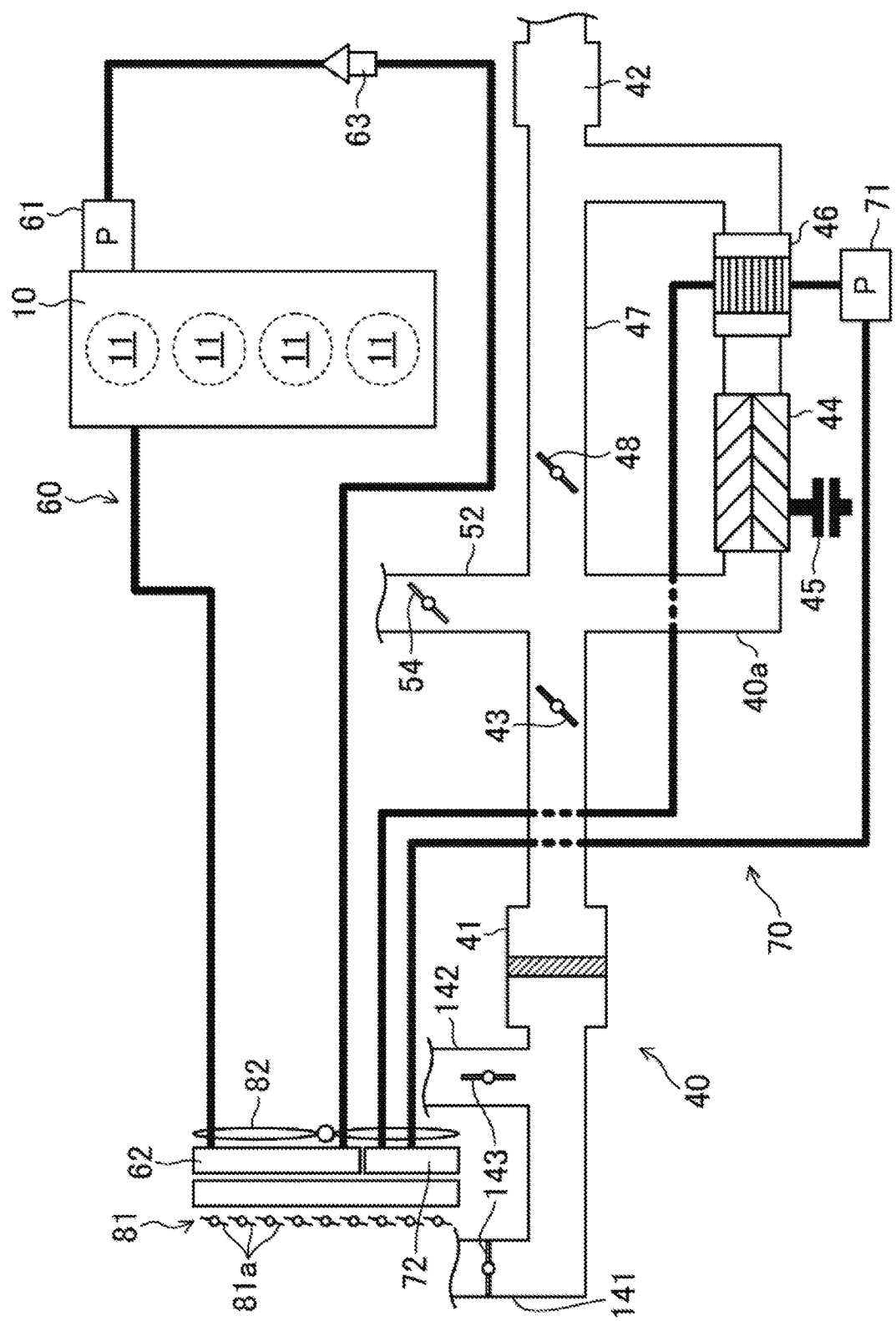
FIG. 4 is a view schematically illustrating a part of a cooling system of the engine.

An intake passage 40 is connected to one side of the engine body 10. The intake passage 40 communicates with the intake port 18 of each cylinder 11. The intake passage 40 is a passage through which intake air introduced into the combustion chamber 17 circulates. As illustrated in FIGS. 1 and 4, the intake passage 40 according to this embodiment has a first air intake part 141 which takes in fresh air at the same temperature as the ambient temperature to the intake passage 40, and a second air intake part 142 which takes in the fresh air at a temperature higher than the ambient temperature to the intake passage 40. The configurations of the air intake parts 141 and 142 will be described later.

An air cleaner 41 which filters the fresh air is disposed in the intake passage 40 at a part immediately downstream of the air intake parts 141 and 142. A surge tank 42 is disposed near the downstream end of the intake passage 40. A part of the intake passage 40 downstream of the surge tank 42 constitutes independent passages branched for every cylinder 11. The downstream end of the independent passage is connected to the intake port 18 of each cylinder 11.

A throttle valve 43 is disposed between the air cleaner 41 and the surge tank 42 in the intake passage 40. The throttle valve 43 varies an opening of a valve to adjust an amount of fresh air introduced into the combustion chamber 17.

A supercharging side passage 40a where a compressor of a mechanical supercharger 44 (hereinafter, simply referred to as the "supercharger 44") is disposed downstream of the throttle valve 43 is provided in the intake passage 40. The supercharger 44 boosts intake air introduced into the combustion chamber 17. In this embodiment, the supercharger 44 is a supercharger which is driven by the engine body 10. The supercharger 44 may be a Lysholm type, for example. The configuration of the supercharger 44 is not limited in particular. The supercharger 44 may also be a root type, a vane type, or a centrifugal type. The supercharging side passage 40a is one example of a first passage.

An electromagnetic clutch 45 is provided between the supercharger 44 and the engine body 10. The electromagnetic clutch 45 transmits a driving force from the engine body 10 to the supercharger 44, or intercepts the transmission of the driving force between the supercharger 44 and the engine body 10. As will be described later, an ECU 100 switches the disconnection (interception) and the connection (transmission) of the electromagnetic clutch 45 to switch the supercharger 44 between a driving state and a non-driving state. That is, the electromagnetic clutch 45 is a clutch which switches the driving and the non-driving of the supercharger 44. The engine 1 is configured to switch between the supercharger 44 boosting intake air introduced into the combustion chamber 17 and the supercharger 44 not boosting intake air introduced into the combustion chamber 17.

An intercooler 46 is disposed immediately downstream of the supercharger 44 in the supercharging side passage 40a. The intercooler 46 cools intake air compressed by the supercharger 44. In this embodiment, the intercooler 46 is of a fluid-cooling type, and intercooler coolant circulates therethrough. The intercooler coolant is coolant different from the engine coolant.

A bypass passage 47 is connected to the intake passage 40. The bypass passage 47 connects a part of the supercharging side passage 40a upstream of the supercharger 44 to a part downstream of the intercooler 46 so as to bypass the supercharger 44 and the intercooler 46. That is, the bypass passage 47 communicates to the supercharging side passage 40a at least downstream of the supercharger 44. The bypass passage 47 is not provided with the supercharger. The bypass passage 47 is one example of a second passage.

An air bypass valve 48 which opens and closes the bypass passage 47 is disposed in the bypass passage 47. In this embodiment, the air bypass valve 48 is an on-off valve.

When the supercharger 44 is not driven (i.e., when the electromagnetic clutch 45 is disconnected), the air bypass valve 48 is made into an open state (ON state). Therefore, gas which flows through the intake passage 40 bypasses the supercharger 44, and is introduced into the combustion chamber 17 of the engine 1. The engine 1 is operated in a non-boosted state (i.e., natural aspirated state).

When the supercharger 44 is driven (i.e., when the electromagnetic clutch 45 is connected) while the air bypass valve 48 is opened, intake air flows into the supercharging side passage 40a after passing through the throttle valve 43. This is because a negative pressure is generated in the supercharging side passage 40a by the supercharger 44 being driven. Then, a portion of the intake air which passed through the supercharger 44 of the supercharging side passage 40a flows back to the upstream side of the supercharger 44 through the bypass passage 47. At this time, an amount of intake air according to the engine specification is introduced into the combustion chamber 17 of the engine body 10, similar to the non-driving state of the supercharger 44. Therefore, even if the supercharger 44 is driven, intake air can be introduced into the combustion chamber 17 in the non-boosted state (strictly speaking, slightly boosted). Note that the phrase "when supercharging or boosting" as used herein refers to a case where the pressure inside the surge tank 42 exceeds the atmospheric pressure, and the phrase "when not supercharging or not boosting" as used herein refers to a case where the pressure inside the surge tank 42 becomes below the atmospheric pressure.

On the other hand, when the supercharger 44 is driven while the air bypass valve 48 is closed (OFF state), intake air is introduced into the combustion chamber 17 in the boosted state. The amount of intake air at this time is more than an amount of intake air introduced into the combustion chamber 17 in the non-boosted state.

Thus, the electromagnetic clutch 45 and the air bypass valve 48 are examples of an intake air flow rate adjuster which adjusts a ratio of the amount of intake air passing through the supercharging side passage 40a and the amount of intake air passing through the bypass passage 47. Note that the air bypass valve 48 may be comprised of a valve which can continuously vary its opening.

Figure 2:
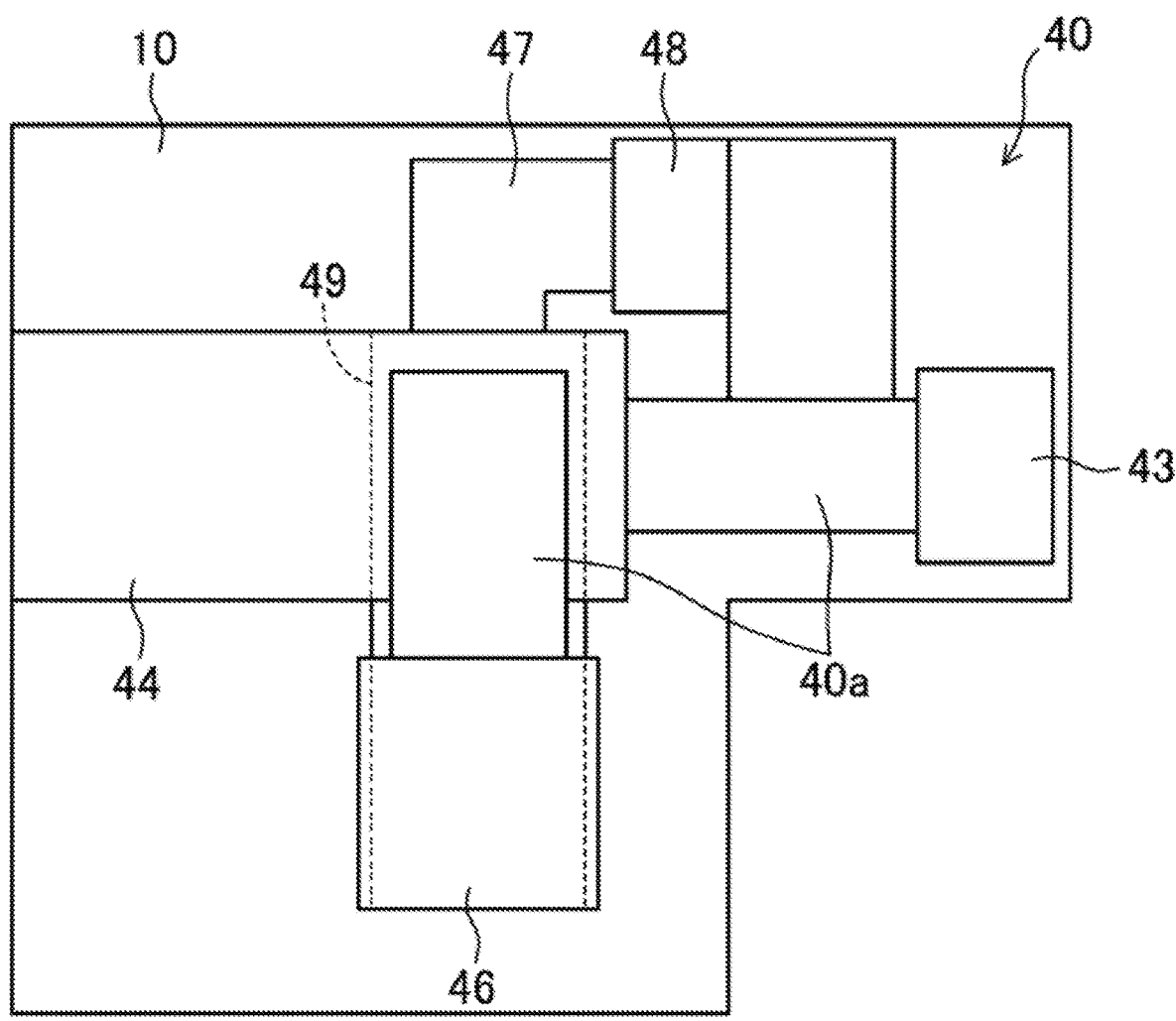
FIG. 2 is a front view schematically illustrating a layout of a first passage and a second passage with respect to an engine body.
Figure 3:
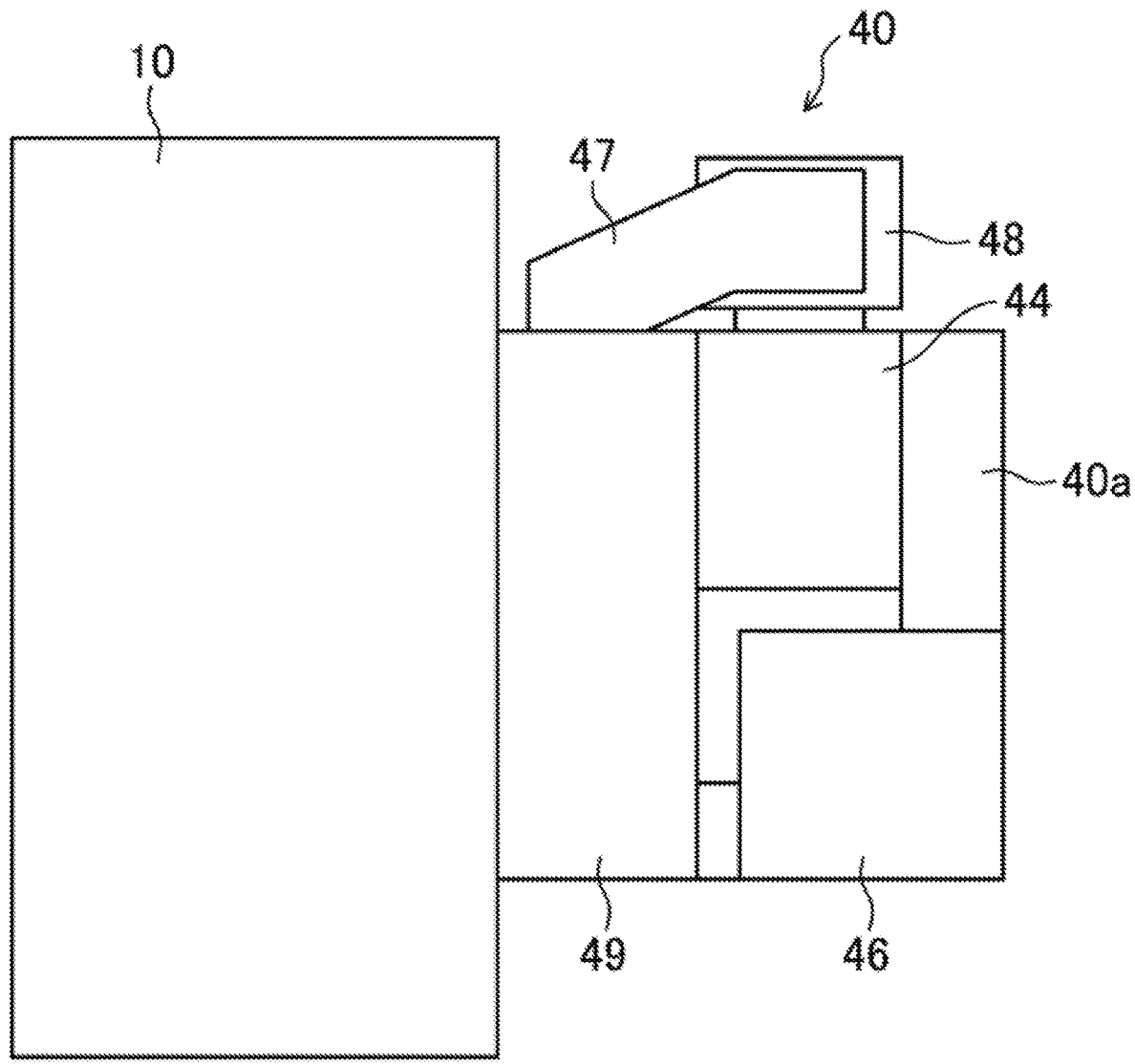
FIG. 3 is a side view schematically illustrating the layout of the first passage and the second passage with respect to the engine body.

FIGS. 2 and 3 schematically illustrate a layout of the supercharging side passage 40a and the bypass passage 47 with respect to the engine body 10. Note that in FIGS. 2 and 3, illustration of an exhaust gas recirculation (EGR) passage 52 and the exhaust passage 50 (described later) is omitted.

As illustrated in FIG. 2, the bypass passage 47 branches upwardly at a part of the intake passage 40 between the throttle valve 43 and the supercharger 44. The bypass passage 47 extends upwardly from the branch part and extends toward one side of the cylinder lined-up direction, and then extends downwardly and extends toward the surge tank 42 in an intake manifold 49. The intake manifold 49 includes the surge tank 42 and the independent passage described above.

As illustrated in FIG. 3, the supercharging side passage 40a extends downwardly from the supercharger 44, then extends toward the engine body 10 and is connected to the bypass passage 47 in the intake manifold 49.

As illustrated in FIGS. 2 and 3, the supercharging side passage 40a and the bypass passage 47 are disposed close to each other in the vertical direction. Therefore, for example, when the bypass passage 47 is heated by intake air, the supercharging side passage 40a is also heated by the heat transfer.

An exhaust passage 50 is connected to the other side of the engine body 10. The exhaust passage 50 communicates with the exhaust port 19 of each cylinder 11. The exhaust passage 50 is a passage through which exhaust gas discharged from the combustion chamber 17 circulates. Although detailed illustration of an upstream part of the exhaust passage 50 is omitted, it constitutes independent passages branched for every cylinder 11. The upstream end of the independent passage is connected to the exhaust port 19 of each cylinder 11.

An exhaust gas purification system having a plurality of catalytic converters is disposed in the exhaust passage 50. Although illustration of an upstream catalytic converter is omitted, it is disposed in an engine bay. The upstream catalytic converter has a three-way catalyst 511 and a GPF (Gasoline Particulate Filter) 512. A downstream catalytic converter is disposed outside the engine bay. The downstream catalytic converter has a three-way catalyst 513. Note that the exhaust gas purification system is not limited to the illustrated configuration. For example, the GPF may be omitted. Moreover, the catalytic converter is not limited to those having the three-way catalyst. Further, the disposed order of the three-way catalyst and the GPF may be change suitably.

An EGR passage 52 which constitutes an external EGR system is connected between the intake passage 40 and the exhaust passage 50. The EGR passage 52 is a passage which recirculates a portion of exhaust gas to the intake passage 40. The upstream end of the EGR passage 52 is connected to the exhaust passage 50 between the upstream catalytic converter and the downstream catalytic converter. The downstream end of the EGR passage 52 is connected to the intake passage 40 at a location upstream of the supercharger 44. Exhaust gas which flows through the EGR passage 52 (hereinafter, referred to as "the EGR gas") enters into the intake passage 40 upstream of the supercharger 44, without passing through the air bypass valve 48 of the bypass passage 47, when introduced into the intake passage 40.

An EGR cooler 53 of a fluid cooling type is disposed in the EGR passage 52. The EGR cooler 53 cools the EGR gas passing through the EGR passage 52. An EGR valve 54 is disposed in the EGR passage 52. The EGR valve 54 is configured to adjust a flow rate of the EGR gas which flows through the EGR passage 52. By varying the opening of the EGR valve 54, a recirculating amount of the cooled EGR gas can be adjusted. The EGR valve 54 may be comprised of an on-off valve, or may be comprised of a valve which can continuously vary the valve opening.

(Cooling System of Engine)

Next, a cooling system of the engine 1 is described. As illustrated in FIG. 4, the cooling system of the engine 1 includes a first cooling path 60 which cools the engine body 10 by circulating the engine coolant in the engine body 10, and a second cooling path 70 which cools intake air after passing through the supercharger 44 by circulating the intercooler coolant in the intercooler 46.

The first cooling path 60 is provided with a first pump 61, a first radiator 62 configured to cool the engine coolant which flows through the first cooling path 60, and a flow rate control valve 63 which adjusts a flow rate of the engine coolant circulating through the first cooling path 60.

The first pump 61 is a mechanical pump which is driven by the crankshaft 15 of the engine body 10 in an interlocked manner. A discharge port of the first pump 61 is connected to the water jacket 12a of the engine body 10.

The first radiator 62 cools the engine coolant which passes through the water jacket of the engine body 10 and is discharged from the cylinder head 13. The first radiator 62 cools the engine coolant by outside air when a vehicle to which the engine 1 is mounted travels forward.

The flow rate control valve 63 is disposed at an intermediate location of a path through which the engine coolant which is discharged from the first radiator 62 and flows into the first pump 61 passes. That is, the flow rate control valve 63 is disposed at the entrance side into the engine body 10 in the first cooling path 60. In this embodiment, the flow rate control valve 63 is comprised of an electric thermostat valve. In detail, the flow rate control valve 63 is a valve in which a heating wire is built into the thermostat valve. Fundamentally, when the temperature of the engine coolant is above a preset fluid temperature setting, the flow rate control valve 63 is configured to open according to the temperature. However, by applying an electric current to the heating wire, it can open even when the temperature of the engine coolant is below the fluid temperature setting.

Figure 5:
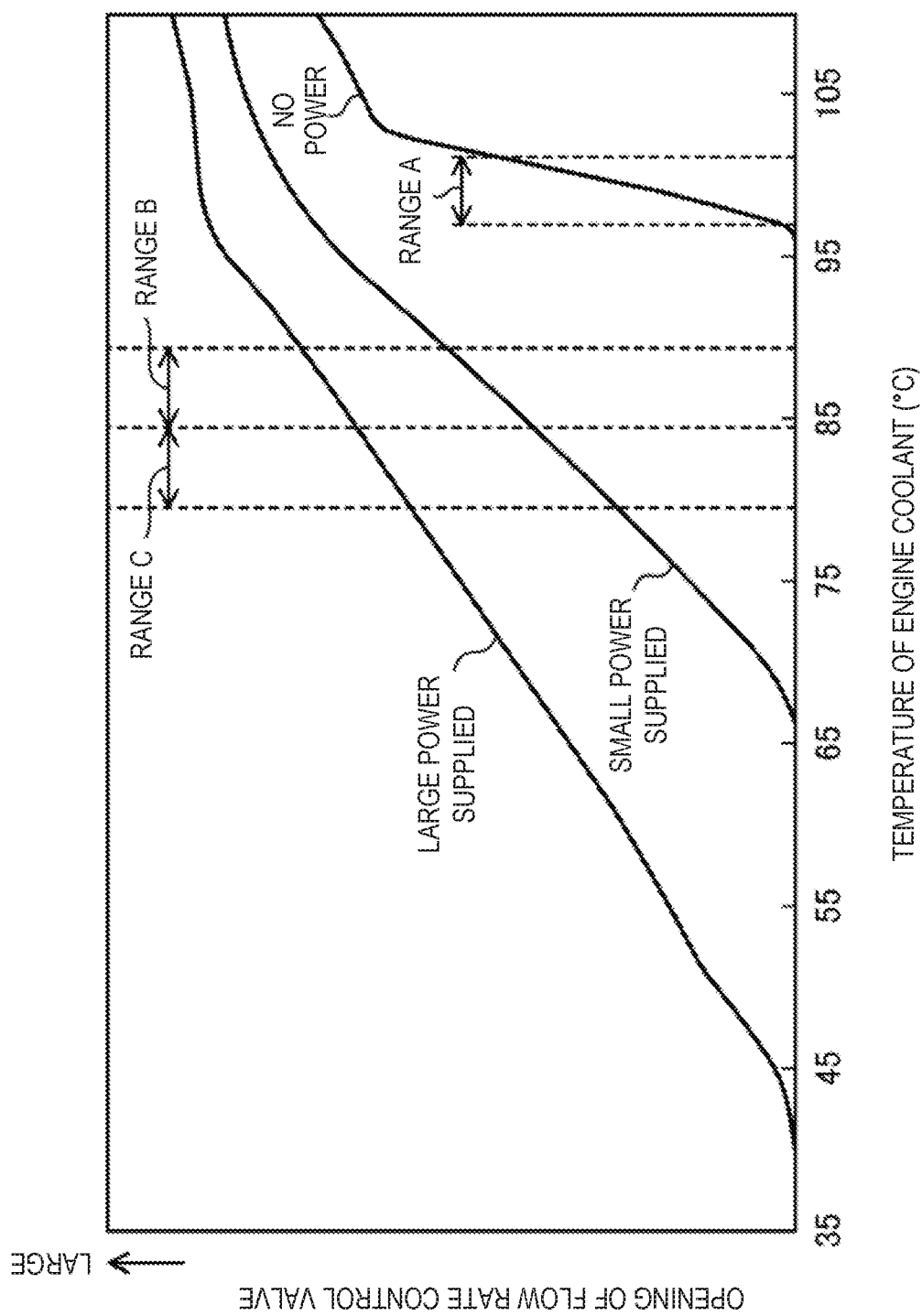
FIG. 5 is a graph illustrating one example of a characteristic of a flow rate control valve to temperature of engine coolant.

FIG. 5 illustrates one example of a characteristic of the flow rate control valve 63 to the temperature of the engine coolant. In FIG. 5, the temperature of the engine coolant illustrated on the horizontal axis is the temperature at the location of the flow rate control valve 63, and it differs from the temperature of the engine coolant which flows into the first radiator 62.

As illustrated in FIG. 5, when the power is not supplied, the flow rate control valve 63 begins to open when the temperature of the engine coolant is 95° C. to 96° C. On the other hand, when the power is supplied, it can open even if the temperature of the engine coolant is below 95° C. As illustrated in FIG. 5, the temperature at which the flow rate control valve 63 begins to open is lowered as the current supplied to the heating wire increases. Moreover, the opening of the flow rate control valve 63 while the temperature is constant can be increased as the current supplied to the heating wire increases, within a range of the opening of the flow rate control valve 63 being smaller than a fully opened state. Note that, in this embodiment, the fluid temperature setting is set as 95° C. to 97° C. Moreover, the flow rate control valve 63 may be an electromagnetic valve, such as a solenoid valve, instead of the thermostat valve.

The power supplied to the flow rate control valve 63 is adjusted based on the operating state of the engine body 10, the ambient temperature, etc. so that the temperature of the engine coolant becomes a suitable temperature.

Note that although illustration is omitted, the first cooling path 60 also passes through the EGR cooler 53. That is, the EGR gas passing through the EGR passage 52 is cooled by a heat exchange with the engine coolant.

The second cooling path 70 is provided with a second pump 71, and a second radiator 72 which cools the intercooler coolant which flows through the second cooling path 70.

The second pump 71 is an electric pump driven by electric power. The second pump 71 is configured to increase a discharging amount of the intercooler coolant as the supplied electric power increases.

The second radiator 72 cools the intercooler coolant discharged from the intercooler 46. The second radiator 72 is disposed below and adjacent to the first radiator 62. The second radiator 72 cools the intercooler coolant by outside air when the vehicle to which the engine 1 is mounted travels forward. The intercooler coolant cooled by the second radiator 72 flows into the second pump 71.

The cooling system of the engine 1 includes a grille shutter 81 and a radiator fan 82, as a mechanism to send the outside air to the first and second radiators 62 and 72.

The grille shutter 81 is provided to a location of the vehicle forward of the first and second radiators 62 and 72. The grille shutter 81 is comprised of a plurality of flappers 81a which rotate on respective axes extending in the vehicle width direction. The grille shutter 81 is fully opened when the flappers 81a become perpendicular to the vertical direction, and is fully closed when the flappers 81a become substantially parallel to the vertical direction. A flow rate of the air taken in into the engine bay, i.e., an amount of the outside air which flows to the first and second radiators 62 and 72, is adjusted by the angle of the flappers 81a with respect to the vertical direction. The angle of the flappers 81a with respect to the vertical direction (i.e., an opening of the grille shutter 81) is adjustable electrically. Note that the term "vertical direction" as used herein refers to the up-and-down direction of the vehicle 1 and normally corresponds to a direction perpendicular to a road surface. Note that "forward" and "rearward" in the vehicle mean the directions when the vehicle is oriented normally.

The radiator fan 82 is provided rearward of the first and second radiators 62 and 72 and forward of the second air intake part 142. The radiator fan 82 draws the outside air by rotating to assist the outside air to flow through the first and second radiators 62 and 72. The radiator fan 82 is configured to increase a drawing amount of the outside air as its rotational speed increases. The radiator fan 82 is configured to be electrically adjustable of the rotational speed.

The outside air taken in through the grille shutter 81 cools the coolant which flows through the first and second radiators 62 and 72 by a heat exchange with the coolant. The outside air which passed through the first and second radiators 62 and 72 flows rearward of the radiator fan 82.

(Fresh Air Intake Structure of Intake Passage)

As described above, in this embodiment, the intake passage 40 has the two air intake parts comprised of the first and second air intake parts 141 and 142. As illustrated in FIG. 4, the first air intake part 141 is located forward of the radiators 62 and 72, in more detail, forward of the grille shutter 81.

The first air intake part 141 takes in the outside air (air not heated) to the intake passage 40. On the other hand, the second air intake part 142 is located rearward of the radiators 62 and 72, in more detail, rearward of the radiator fan 82. The second air intake part 142 takes in air (outside air), which passes through the first and second radiators 62 and 72 and flows rearward of the radiator fan 82, to the intake passage 40. That is, air heated by heat exchange with the coolant which flows through the first and second radiators 62 and 72 is taken from the second air intake part 142. Thus, the second air intake part 142 takes in air, at a temperature higher than the ambient temperature, to the intake passage 40.

The first and second air intake parts 141 and 142 is provided with an intake air switch valve 143. A valve of the intake air switch valve 143 is disposed at each of the first and second air intake parts 141 and 142, and the valves operate in an interlocked manner. In detail, the opening of the valve of the second air intake part 142 becomes smaller as the opening of the valve of first air intake part 141 becomes larger. Thus, while not changing the total amount of air taken in through the first and second air intake parts 141 and 142 by the intake air switch valve 143, the ratio of the air amount taken into the intake passage 40 through the first air intake part 141 to the air amount taken into the intake passage 40 through the second air intake part 142 can be changed. Therefore, by varying the opening of each valve, the temperature of the air (fresh air) taken into the intake passage 40 can be adjusted. Although illustration is omitted, the intake air switch valve 143 according to this embodiment changes the opening of each valve in the interlocked manner by coupling the valves through a common axis. Note that the intake air switch valve 143 provided to the first air intake part 141 and the intake air switch valve 143 provided to the second air intake part 142 may be configured to be adjustable of the valve openings independently.

(Control System of Engine)

A controlling device of the engine 1 is provided with the ECU (Engine Control Unit) 100 for operating the engine 1. The ECU 100 is a controller based on a well-known microcomputer, and as illustrated in FIG. 6, includes a processor (e.g., a central processing unit (CPU)) 101 which executes a program, memory 102 which is comprised of RAM (Random Access Memory) and/or ROM (Read Only Memory) for example, and stores the programs and data, and an input/output bus 103 which inputs and outputs an electrical signal.

Figure 6:
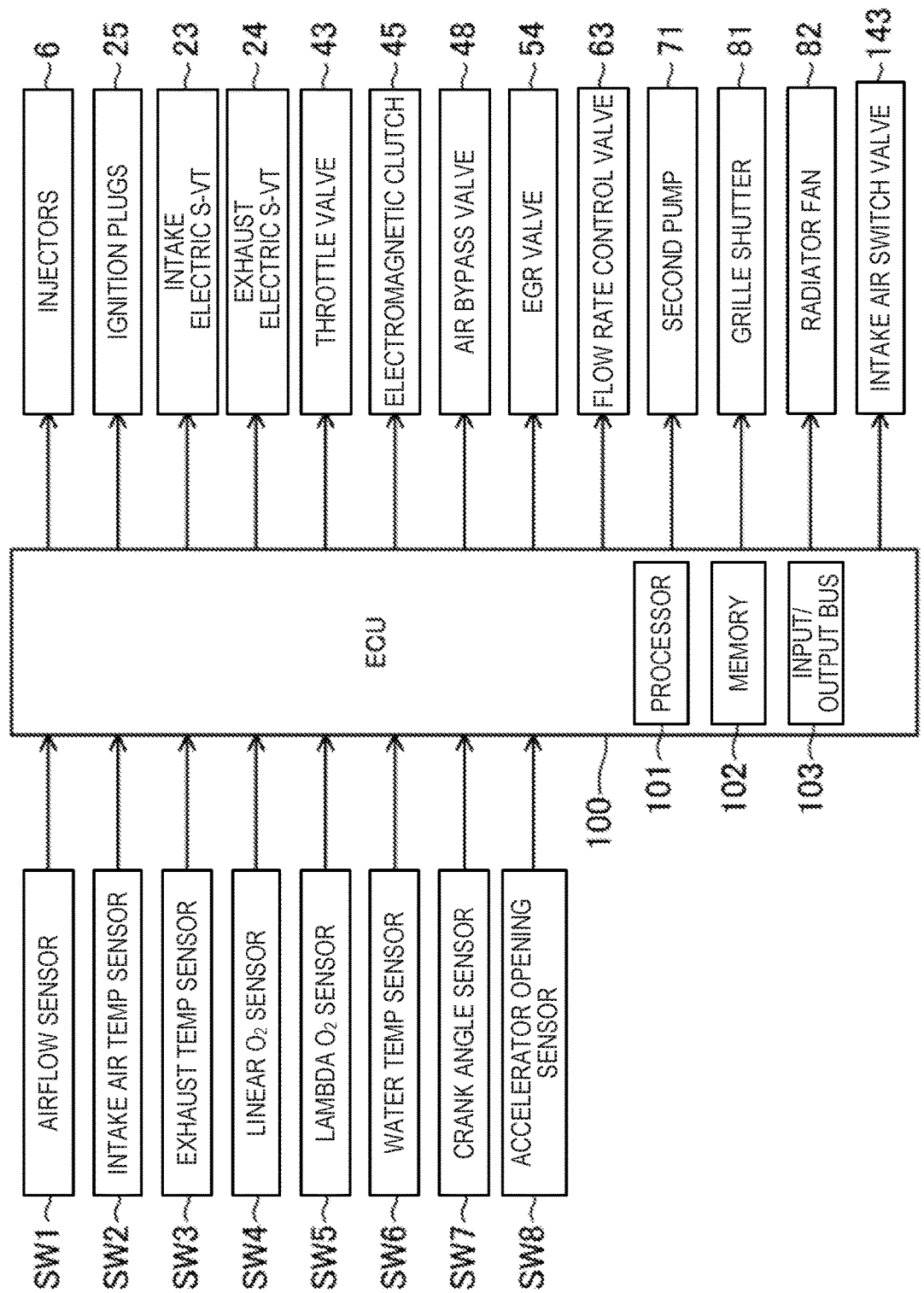
FIG. 6 is a block diagram illustrating a configuration of a controlling device of the engine.

As illustrated in FIGS. 1 and 6, the ECU 100 is connected to various kinds of sensors SW1-SW8. The sensors SW1-SW8 each output a detection signal to the ECU 100. The sensors include the following sensors.

That is, an airflow sensor SW1 which is disposed downstream of the air cleaner 41 in the intake passage 40 and detects a flow rate of fresh air flowing through the intake passage 40, an intake temperature sensor SW2 which is attached to the surge tank 42 and detects the temperature of intake air supplied to the combustion chamber 17, an exhaust temperature sensor SW3 which is disposed at the exhaust passage 50 and detects the temperature of exhaust gas discharged from the combustion chamber 17, a linear 02 sensor SW4 which is disposed upstream of the upstream catalytic converter in the exhaust passage 50 and detects an oxygen concentration in the exhaust gas, a lambda ($\lambda$) $O_2$ sensor SW5 which is disposed downstream of the three-way catalyst 511 in the upstream catalytic converter and detects an oxygen concentration in the exhaust gas, a fluid temperature sensor SW6 which is attached to the cylinder head 13 of the engine body 10 and detects the temperature of the engine coolant, a crank angle sensor SW7 which is attached to the engine body 10 and detects a rotation angle of the crankshaft 15, and an accelerator opening sensor SW8 which is attached to an accelerator pedal mechanism and detects an accelerator opening corresponding to an amount of operation of the accelerator pedal.

The ECU 100 determines the operating state of the engine body 10 and calculates a controlled amount (parameter) of each device based on these detection signals. The ECU 100 outputs a control signal according to the calculated controlled amount to each of the injector 6, the ignition plug 25, the intake electric S-VT 23, the exhaust electric S-VT 24, the throttle valve 43, the electromagnetic clutch 45 of the supercharger 44, the air bypass valve 48, the EGR valve 54, the flow rate control valve 63, the second pump 71, the grille shutter 81, the radiator fan 82, and the intake air switch valve 143.

For example, the ECU 100 calculates an engine speed of the engine body 10 based on the detection signal of the crank angle sensor SW7. The ECU 100 calculates an engine load of the engine body 10 based on the detection signal of the accelerator opening sensor SW8.

Moreover, the ECU 100 sets a target EGR rate (i.e., a ratio of the EGR gas to the entire gas inside the combustion chamber 17) based on the operating state of the engine body 10 (mainly, the engine load and the engine speed) and a preset map. Then, the ECU 100 determines a target EGR amount based on the target EGR rate and an intake air amount based on the detection signal of the accelerator opening sensor SW8. Moreover, by adjusting the opening of the EGR valve 54, the ECU 100 performs a feedback control so that the external EGR amount introduced into the combustion chamber 17 becomes the target EGR amount.

Further, the ECU 100 performs an air-fuel ratio feedback control when a given control condition is satisfied. Specifically, based on the oxygen concentrations in the exhaust gas detected by the linear 02 sensor SW4 and the lambda 02 sensor SW5, the ECU 100 adjusts a fuel injection amount of the injector 6 so that the air-fuel ratio of the mixture gas becomes a desired value.

Moreover, the ECU 100 sets a flow rate of the intercooler coolant supplied to the intercooler 46 per unit time based on the operating state of the engine body 10 and a preset map. Then, the ECU 100 sets the electric power supplied to the second pump 71 so that the flow rate of the setting is discharged from the second pump 71.

(Intake Air Temperature Control of Engine)

Figure 7:
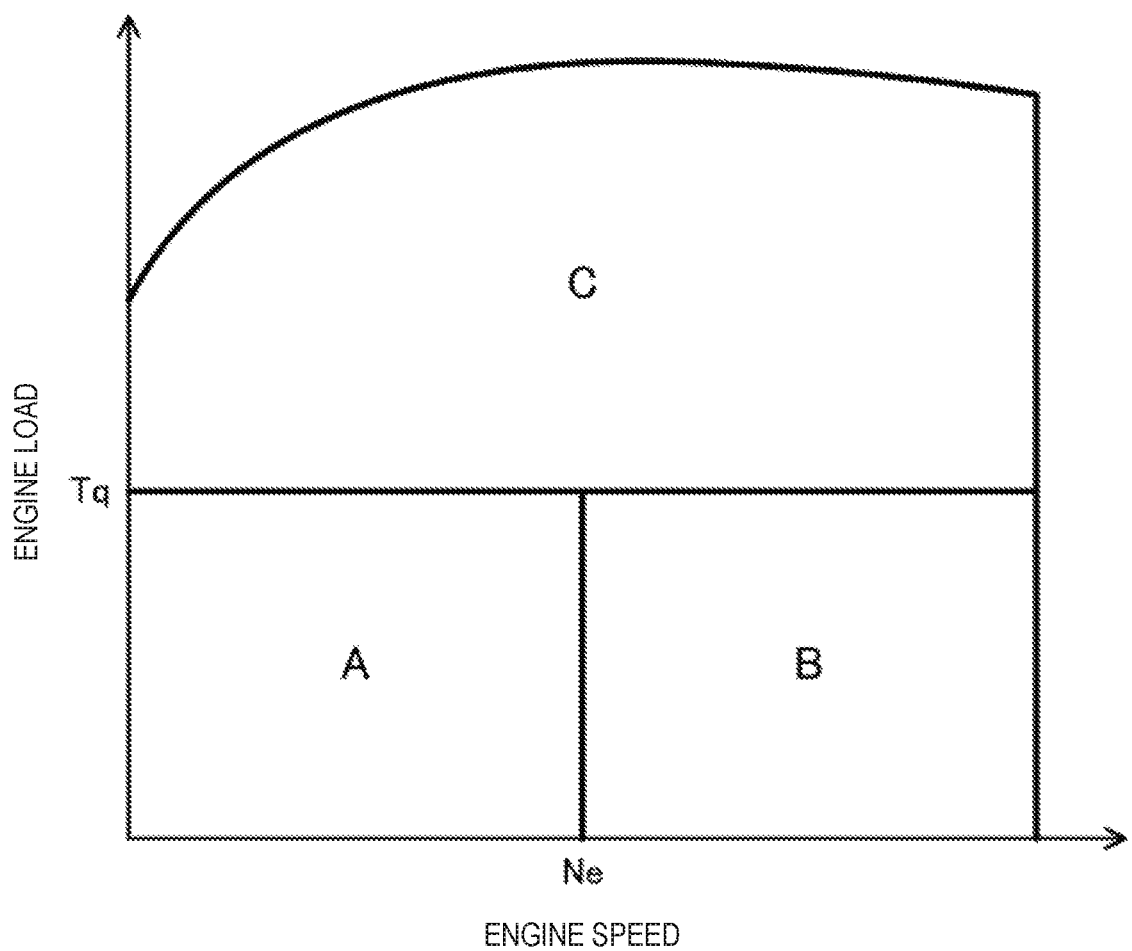
FIG. 7 is a view illustrating an operating range map of the engine.

FIG. 7 illustrates an operating range map of the engine 1 when the engine 1 is warm (i.e., after a warmup of the engine body 10). The operating range map of the engine 1 is defined by the engine load and the engine speed, and is divided into three ranges depending on the engine load and the engine speed. In detail, the three ranges are comprised of a range A where an idle operation is included, the engine speed is low below a given engine speed Ne, and the engine load is low below a given load Tq, a range B where the engine speed is high above the given engine speed Ne, and the engine load is below the given load Tq, and a range C where the engine load is the given load Tq and above. Here, the given engine speed Ne may be about 3,500 rpm, for example. In this embodiment, the phrase "after the warm-up of the engine body 10" as used herein refers to a state where the temperature of the engine coolant detected by the fluid temperature sensor SW6 is 80° C. or more, and the temperature of the intake air detected by the intake temperature sensor SW2 is 25° C. or more.

The engine 1 performs SPCCI combustion which is the combination of SI combustion and CI combustion in all the ranges A-C in order to mainly improve combustion stability and fuel efficiency. In order to stably perform the SPCCI combustion, the ECU 100 controls the temperature of intake air introduced into the engine body 10 by using the cooling system of the engine 1. Below, operation of the engine 1 in each range is described in detail with reference to FIGS. 8 to 10.

(Low-load Low-speed Range A)

While the engine body 10 operates in the range A, the engine 1 performs SPCCI combustion in a state where an air-fuel ratio (A/F) of the mixture gas inside the combustion chamber 17 or a gas-fuel ratio (G/F) which is a relation between the total gas weight G inside the cylinder 11 and the weight F of fuel fed to the cylinder 11 is in a lean state which is larger than a stoichiometric air-fuel ratio. In detail, fuel is injected from the injector 6 so that A/F or G/F becomes 25:1 or more, and the ignition plug 25 is operated at a desired timing. In order to stably perform SPCCI combustion (especially, CI combustion) in the lean state, it is required to increase a compression end temperature. Then, the ECU 100 controls and operates each device so that intake air at or above a first intake air temperature Ta1 is introduced into the engine body 10. Note that this first intake air temperature Ta1 is about 80° C., for example.

Figure 8:
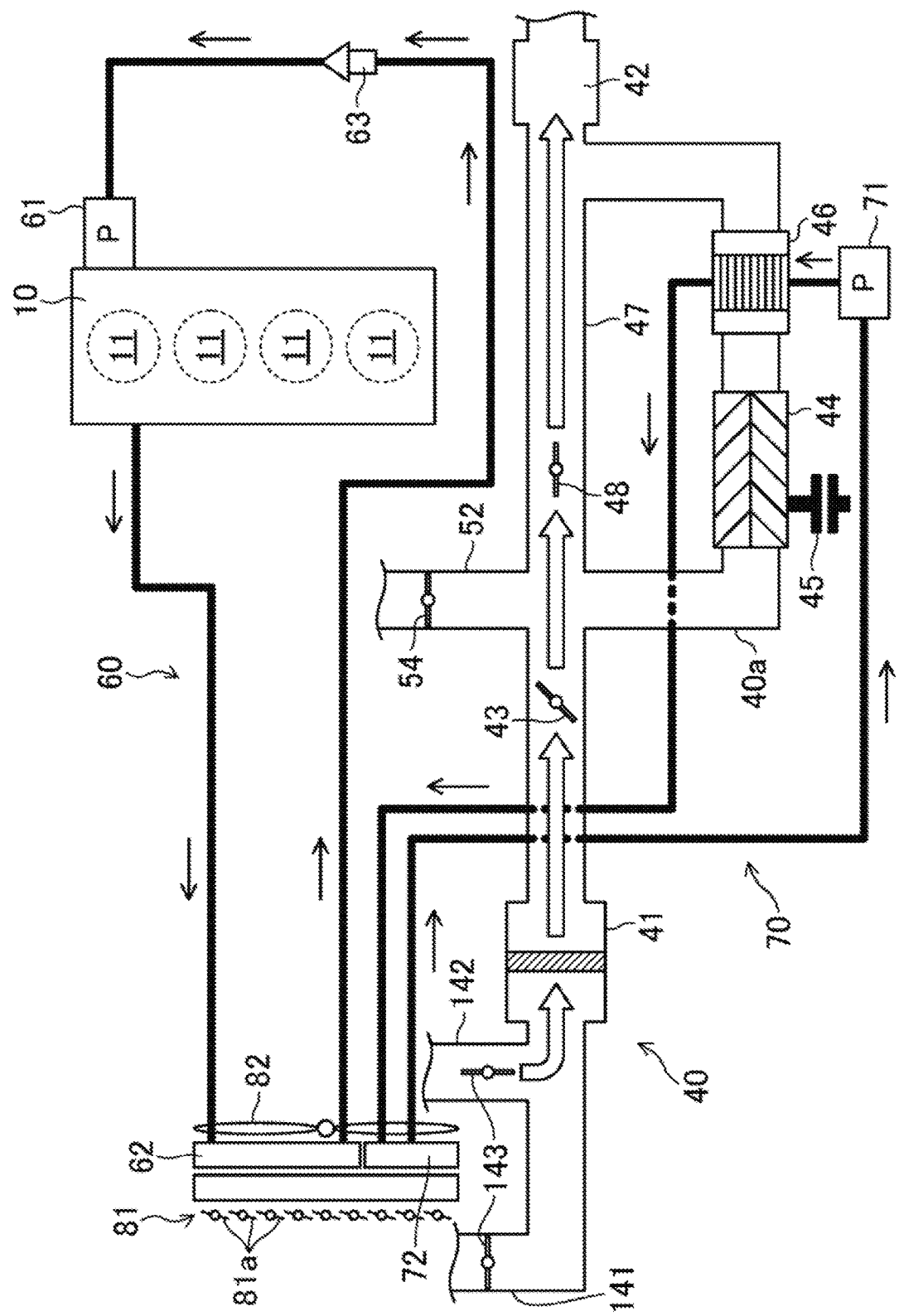
FIG. 8 is a view illustrating a flow of intake air, a flow of engine coolant, and a flow of intercooler coolant in a range A of FIG. 7.

In detail, when the operating state of the engine body 10 is in the range A, as illustrated in FIG. 8, the ECU 100 outputs the control signal to the intake air switch valve 143 so that the first air intake part 141 becomes fully closed and the second air intake part 142 becomes fully opened. Moreover, the ECU 100 outputs control signals to the electromagnetic clutch 45 and the air bypass valve 48 to disconnect the electromagnetic clutch 45 and fully open the air bypass valve 48 so that the supercharger 44 is not driven and the bypass passage 47 is opened. Moreover, the ECU 100 turns off the power to the flow rate control valve 63 so that hot engine coolant flows into the first radiator 62. Moreover, the ECU 100 adjusts the opening of the grille shutter 81 and the rotational speed of the radiator fan 82 so that intake air at the first intake air temperature Ta1 or higher is taken in through the second air intake part 142. Moreover, the ECU 100 fully closes the EGR valve 54.

When the power to the flow rate control valve 63 is turned off, the flow rate control valve 63 will not be opened until the engine coolant becomes above the fluid temperature setting. Thus, in the state where the engine coolant is below the fluid temperature setting, the engine coolant is heated by the heat of the engine body 10 without circulating. When the engine coolant becomes above the fluid temperature setting, the flow rate control valve 63 begins to open and the engine coolant begins to circulate through the first path 60. Therefore, the hot engine coolant above the fluid temperature setting flows into the first radiator 62. The engine coolant which flows into the first radiator 62 is the engine coolant after passing through the flow rate control valve 63 and being heated by the engine body 10. Thus, the temperature of the engine coolant which flows into the first radiator 62 (corresponding to the temperature detected by the fluid temperature sensor SW6) is higher than a given fluid temperature. Note that when the operating state of the engine body 10 is in the range A, the opening of the flow rate control valve 63 varies within a range where the temperature of the engine coolant at the location of the flow rate control valve 63 falls within the "range A" of the graph in FIG. 5.

The ECU 100 controls operations of the grille shutter 81 and the radiator fan 82 so that the detection result of the fluid temperature sensor SW6 becomes a first fluid temperature Tw1. When the detection result of the fluid temperature sensor SW6 is below the first fluid temperature Tw1, the ECU 100 fully closes the opening of the grille shutter 81 and sets the rotational speed of the radiator fan 82 to 0 (i.e., the radiator fan 82 is not driven). Therefore, when the engine coolant is below the first fluid temperature Tw1, the engine coolant is not cooled much and the fluid temperature increases. When the detection result of the fluid temperature sensor SW6 becomes above the first fluid temperature Tw1, the ECU 100 opens the grille shutter 81 and increases the rotational speed of the radiator fan 82. In the state where the hot engine coolant flows into the first radiator 62, when the grille shutter 81 is opened and the radiator fan 82 is driven, hot outside air which has exchanged heat with the hot engine coolant flowing through the first radiator 62 flows rearward of the radiator fan 82. Therefore, the hot outside air, i.e., intake air (fresh air) at or above the first intake air temperature Ta1 is taken into the intake passage 40 through the second air intake part 142. Note that the first fluid temperature Tw1 is a temperature higher than the fluid temperature setting (for example, about 105° C.).

As illustrated in FIG. 8, the hot intake air taken in through the second air intake part 142 passes through the bypass passage 47 and flows into the surge tank 42. Then, the hot intake air is introduced into the combustion chamber 17 of the engine body 10. That is, in the range A, the bypass passage 47 is opened and the supercharging side passage 40a is closed to supply the intake air the non-boosted state to the engine body 10. Therefore, the range A is an example of a "second operating range."

When the detection result of the fluid temperature sensor SW6 becomes below the first fluid temperature Tw1, or when the detection result of the intake temperature sensor SW2 becomes below the first intake air temperature Ta1, the ECU 100 executes at least one of a control to reduce the opening of the grille shutter 81, or a control to lower the rotational speed of the radiator fan 82. Therefore, the intake air at or above the first intake air temperature Ta1 is stably introduced to the engine body 10. Moreover, the ECU 100 adjusts the opening of the grille shutter 81 within a small opening range, in order to keep the temperature of the engine coolant at or above the first fluid temperature Tw1 as much as possible. In detail, the ECU 100 adjusts the opening of the grille shutter 81 so that the angle at the acute angle side of the flappers 81a with respect to the vertical direction falls within a range below 30°.

When the engine body 10 operates in the range A by operating and controlling each device as described above, the hot intake air (at or above the first intake air temperature Ta1) is introduced into the engine body 10. Therefore, SPCCI combustion can be stably performed when the engine body 10 operates in the range A.

Note that although the detail will be described later, when the operating state of the engine body 10 is in the range A, the ECU 100 outputs the control signal to the second pump 71 so that the intercooler coolant is supplied to the intercooler 46.

(Low-load High-speed Range B)

While the engine body 10 operates in the range B, the engine 1 performs SPCCI combustion in the state where A/F or G/F of the mixture gas inside the combustion chamber 17 becomes near the stoichiometric air-fuel ratio. In detail, fuel is injected from the injector 6 so that A/F or G/F becomes 14.5:1 to 15.0:1, and the ignition plug 25 is operated at a desired timing. In the range B, since the engine speed is high, it is necessary to increase the compression end temperature to facilitate a generation of the compression ignition, in order to stably perform SPCCI combustion (especially, CI combustion). Thus, also while the engine body 10 operates in the range B, the ECU 100 controls and operates each device so that intake air at or above the first intake air temperature Ta1 is introduced into the engine body 10.

Figure 9:
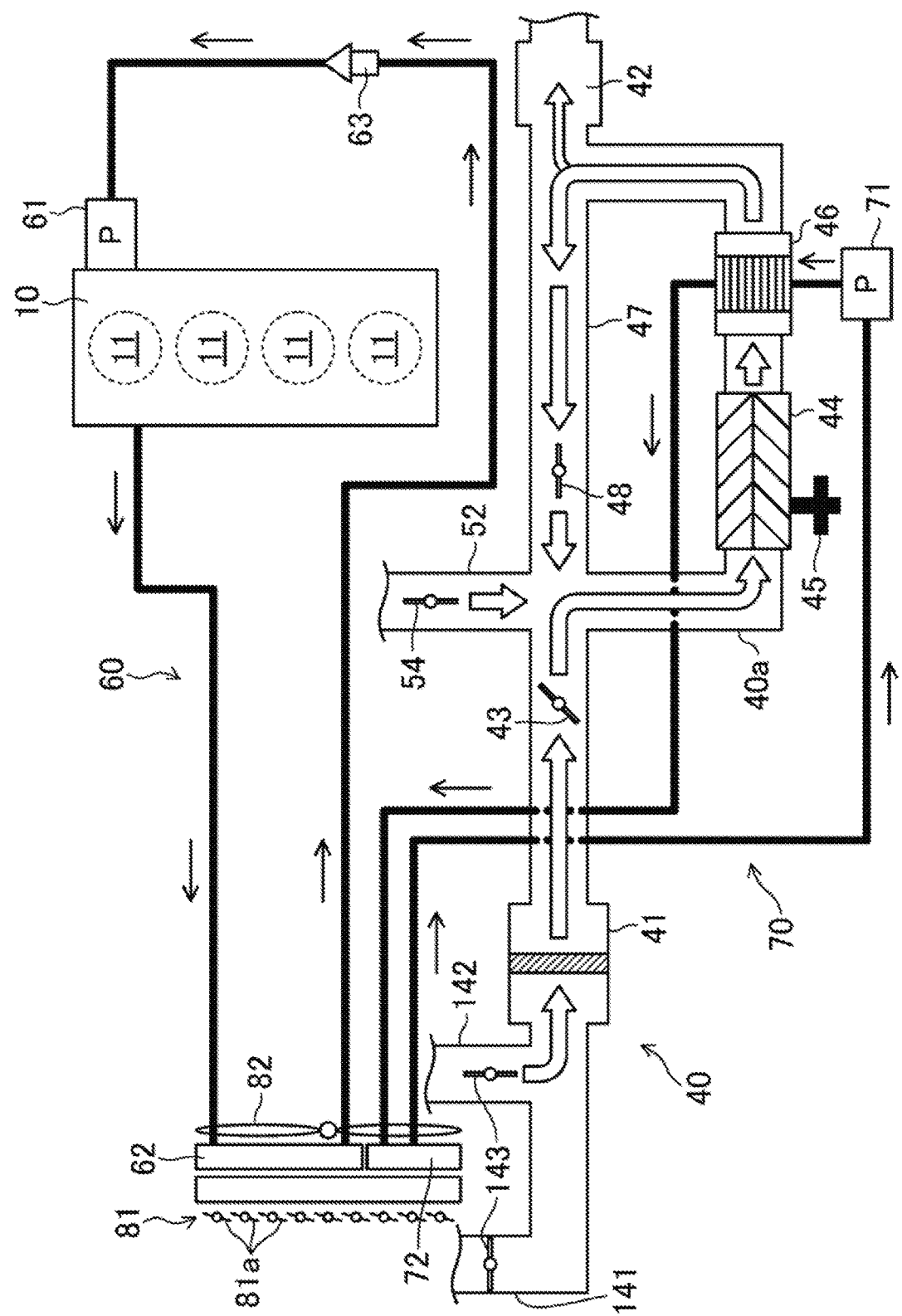
FIG. 9 is a view illustrating a flow of intake air, a flow of engine coolant, and a flow of intercooler coolant in a range B of FIG. 7.

In detail, when the operating state of the engine body 10 is in the range B, as illustrated in FIG. 9, the ECU 100 outputs the control signal to the intake air switch valve 143 so that the first air intake part 141 is fully closed and the second air intake part 142 is fully opened. Moreover, the ECU 100 outputs the control signals to the electromagnetic clutch 45 and the air bypass valve 48 to connect the electromagnetic clutch 45 and fully open the air bypass valve 48 so that the supercharger 44 is driven and the bypass passage 47 is opened. Moreover, the ECU 100 turns on the power to the flow rate control valve 63. Moreover, the ECU 100 adjusts the opening of the grille shutter 81 and the rotational speed of the radiator fan 82 so that intake air at or above the first intake air temperature Ta1 is taken in through the second air intake part 142. Moreover, the ECU 100 opens the EGR valve 54 to introduce the EGR gas.

When turning on the power to the flow rate control valve 63, the flow rate control valve 63 opens, even if the engine coolant is below the fluid temperature setting. Thus, even if the engine coolant is below the fluid temperature setting, the engine coolant circulates through the first path 60. Therefore, the engine coolant below the first fluid temperature Tw1 flows into the first radiator 62. Note that when the operating state of the engine body 10 is in the range B, the opening of the flow rate control valve 63 varies within a range where the temperature of the engine coolant at the location of the flow rate control valve 63 falls within the "range B" of the graph in FIG. 5.

While the operating state of the engine body 10 is in the range B, the ECU 100 opens the grille shutter 81 and drives the radiator fan 82, even if the detection result of the fluid temperature sensor SW6 is below the first fluid temperature Tw1. In more detail, the ECU 100 adjusts the opening of the grille shutter 81 and the rotational speed of the radiator fan 82 so that the detection result of the fluid temperature sensor SW6 becomes below the first fluid temperature Tw1 and above a second fluid temperature Tw2. After the outside air exchanged heat with the engine coolant flowing through the first radiator 62 flows rearward of the radiator fan 82, it is then taken into the intake passage 40 through the second air intake part 142. At this time, the temperature of the intake air (fresh air) taken in from the second air intake part 142 to the intake passage 40 is higher than the ambient temperature, but is lower compared to the case where the operating state of the engine body 10 is in the range A. Note that when the operating state of the engine body 10 is in the range B, the ECU 100 adjusts the opening of the grille shutter 81 within a middle opening range. In detail, ECU 100 adjusts the angle at the acute angle side of the flappers 81a with respect to the vertical direction within a range of 30° or more and below 60°. Moreover, the second fluid temperature Tw2 is a temperature lower than the first fluid temperature Tw1 (for example, about 90° C.).

As described above, when the bypass passage 47 is opened and the supercharger 44 is driven, a portion of the intake air which passed through the supercharger 44 flows back to the upstream side of the supercharger 44 through the bypass passage 47, as illustrated in FIG. 9. Thus, after the portion of the intake air taken into the intake passage 40 through the second air intake part 142 is temporarily compressed by the supercharger 44, it then flows back to the upstream side of the supercharger 44 through the bypass passage 47. The intake air which flowed back to the upstream side of the supercharger 44 through the bypass passage 47 again passes through the supercharger 44. Thus, the intake air inside the intake passage 40 circulates (recirculates) inside the intake passage 40 through the supercharger 44 and the bypass passage 47. Therefore, even if the supercharger 44 is driven, the intake air can be introduced into the combustion chamber 17 in the non-boosted state.

Since the intake air during the recirculation is compressed by the supercharger 44, its temperature increases. Moreover, when the operating state of the engine body 10 is in the range B, since the EGR valve 54 is opened, the EGR gas is taken into the recirculating intake air. The EGR gas is higher in the temperature than the intake air taken into the intake passage 40 through the second air intake part 142. Thus, the temperature of the intake air into which the EGR gas is taken in increases.

In order to prevent the recirculating intake air (fresh air+EGR gas) from becoming excessively high in temperature, the ECU 100 outputs the control signal to the second pump 71 so that the intercooler coolant may be supplied to the intercooler 46. Therefore, the recirculating intake air is cooled by the intercooler 46.

As described above, while the engine body 10 operates in the range B, the intake air is heated by the recirculating of intake air and the introduction of EGR gas. Thus, the intake air at or above the first intake air temperature Ta1 can be introduced into the combustion chamber 17 of the engine body 10, even if the engine coolant is below the first fluid temperature Tw1. Therefore, SPCCI combustion can be stably performed, while the engine body 10 operates in the range B.

(High-Load Range C)

While the engine body 10 operates in the range C, as for the engine 1, A/F or G/F of the mixture gas inside the combustion chamber 17 performs SPCCI combustion in the state near a stoichiometric air-fuel ratio. In detail, fuel is injected from the injector 6 so that A/F or G/F becomes 14.5:1 to 15.0:1, and the ignition plug 25 is operated at a desired timing. In the high engine load state, since there is a large amount of fuel injected, as much intake air (fresh air) as possible is needed in order to acquire a suitable combustion torque. Moreover, in the high engine load state, since there is a large amount of fuel injected, if the temperature of the engine body 10 is too high, the mixture gas self-ignites while being compressed, thereby causing a premature ignition of the fuel at the unintended timing. Thus, when the operating state of the engine body 10 is in the range C, intake air (especially, fresh air) at low temperature and with a high air density needs to be introduced into the engine body 10 in order to stably perform SPCCI combustion. Moreover, it is necessary to cool the engine body 10 appropriately. Thus, the ECU 100 controls and operates each device so that intake air at or below a second intake air temperature Ta2 is introduced into the engine body 10, and the engine body 10 is cooled appropriately. Note that the second intake air temperature Ta2 is a temperature below the first intake air temperature Ta1 (for example, about 60° C.).

Figure 10:
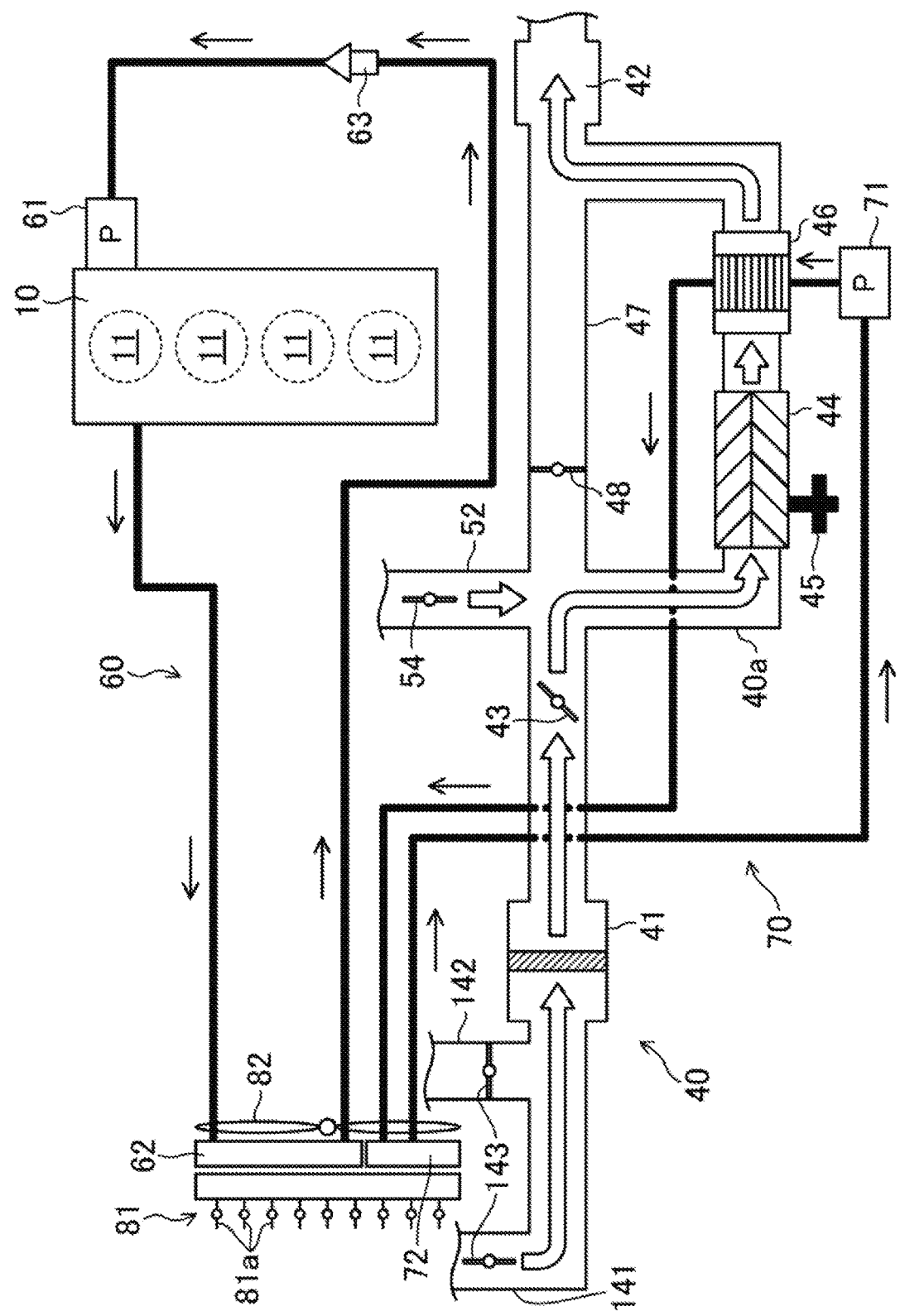
FIG. 10 is a view illustrating a flow of intake air, a flow of engine coolant, and a flow of intercooler coolant in a range C of FIG. 7.

In detail, when the operating state of the engine body 10 is in the range C, as illustrated in FIG. 10, the ECU 100 outputs the control signal to the intake air switch valve 143 so that the first air intake part 141 is fully opened and the second air intake part 142 is fully closed. Moreover, the ECU 100 outputs the control signals to the electromagnetic clutch 45 and the air bypass valve 48 to connect the electromagnetic clutch 45 and fully close the air bypass valve 48 so that the supercharger 44 is driven and the bypass passage 47 is closed. Moreover, the ECU 100 turns on the power to the flow rate control valve 63. Moreover, the ECU 100 adjusts the opening of the grille shutter 81 and the rotational speed of the radiator fan 82 so that the engine coolant and the intercooler coolant are cooled. Moreover, the ECU 100 opens the EGR valve 54 to introduce the EGR gas.

As described above, by turning on the power to the flow rate control valve 63, the flow rate control valve 63 opens, even if the engine coolant is below the given fluid temperature. Thus, even if the engine coolant is below the given fluid temperature, the engine coolant circulates through the first path 60. Therefore, the engine coolant below the given fluid temperature flows into the first radiator 62. Note that when the operating state of the engine body 10 is in the range C, the opening of the flow rate control valve 63 varies within a range where the temperature of the engine coolant at the location of the flow rate control valve 63 falls within the "range C" of the graph in FIG. 5.

When the operating state of the engine body 10 is in the range C, the ECU 100 opens the grille shutter 81 and drives the radiator fan 82. At this time, the ECU 100 adjusts the opening of the grille shutter 81 and the rotational speed of the radiator fan 82 so that the detection result of the fluid temperature sensor SW6 becomes the second fluid temperature Tw2. In detail, the ECU 100 adjusts the opening of the grille shutter 81 within a large opening range, i.e., a range where the angle at the acute angle side of the flappers 81a with respect to the vertical direction (including a right angle) becomes 60° or more and 90° or less. Moreover, the ECU 100 makes the rotational speed of the radiator fan 82 higher than the rotational speed when the operating state of the engine body 10 is in the ranges A and B. Accordingly, as compared with the cases where the operating state of the engine body 10 is in the ranges A and B (i.e., when the engine load is low), the amount of the outside air which flows to the first and second radiators 62 and 72 increases. Therefore, the coolant which flows through the first and second radiators 62 and 72 can be actively cooled, and the engine body 10 can be cooled appropriately.

On the other hand, in the intake system, intake air (fresh air) is taken into the intake passage 40 through the first air intake part 141. When the operating state of the engine body 10 is in the range C, since the EGR valve 54 is opened, EGR gas is taken into the intake air which is taken in to the intake passage 40 through the first air intake part 141. Moreover, since the air bypass valve 48 is fully closed, the intake air (fresh air+EGR gas) flows toward the supercharging side passage 40a. Since the electromagnetic clutch 45 is connected and the supercharger 44 is driven, the intake air which flowed toward the supercharging side passage 40a is boosted by the supercharger 44.

The ECU 100 outputs the control signal to the second pump 71 so that the intercooler coolant is supplied to the intercooler 46, in order to make the temperature of the intake air boosted by the supercharger 44 at or below the second intake air temperature Ta2. At this time, the ECU 100 outputs the control signal to the second pump 71 so that the flow rate of the intercooler coolant supplied per unit time to the intercooler 46 becomes higher than the flow rate of the intercooler coolant when the operating state of the engine body 10 is in the range B (becomes the first flow rate described later). Thus, the temperature of the intake air can be made at or below the second intake air temperature Ta2 by increasing the flow rate of the intercooler coolant supplied to the intercooler 46. Moreover, as described above, when the operating state of the engine body 10 is in the range C, the amount of the outside air which flows to the second radiator 72 increases, as compared with the cases when the operating state of the engine body 10 is in the ranges A and B. Thus, the temperature of the intercooler coolant is low as compared with the cases when the operating state of the engine body 10 is in the ranges A and B. Therefore, the temperature of intake air can be made at or below the second intake air temperature Ta2 more efficiently. Note that when the operating state of the engine body 10 is the range C, the ECU 100 may output the control signal to the second pump 71 so that the flow rate of the intercooler coolant supplied to the intercooler 46 increases in order to lower the temperature of the intake air introduced into the engine body 10, as the engine load is higher.

The intake air which is boosted by the supercharger 44 and cooled at or below the second intake air temperature Ta2 by the intercooler 46 is supplied to the combustion chamber 17 of the engine body 10 through the surge tank 42. That is, in the range C, the bypass passage 47 is closed and the supercharging side passage 40a is opened to supply the intake air boosted by the supercharger 44 to the engine body 10. Therefore, the range C is an example of a "first operating range."

By operating and controlling each device as described above, while the engine body 10 operates in the range C, the cold intake air (at or below the second intake air temperature Ta2) is introduced into the engine body 10, and the engine body 10 is cooled appropriately. Therefore, while the engine body 10 operates in the range C, SPCCI combustion can be stably performed.

(Control of Intercooler)

Here, if the engine load goes up by an acceleration etc. of the vehicle while the engine 1 operates in the range A, the operating state of the engine body 10 transits from the range A to the range C. At this time, as described above, the passage through which the intake air passes is switched to the supercharging side passage 40a from the bypass passage 47 so that the boosted intake air is supplied to the engine body 10. Since the operating state of the engine body 10 changes rapidly during the transition, such as the acceleration of the vehicle, the cooling of the intake air by the intercooler 46 may be too slow to keep up. If the cooling of the intake air by the intercooler 46 is not quick enough, the excessively hot intake air is supplied to the engine body 10. Moreover, in this embodiment, while the engine 1 operates in the range A, the intake air at the first intake-air temperature Ta1 passes through the bypass passage 47. Therefore, the supercharging side passage 40a is heated by the heat transfer from the bypass passage 47. When the supercharging side passage 40a is heated, the air inside the supercharging side passage 40a is also heated. Therefore, when the operating state of the engine body 10 goes into the range C from the range A, the heated air may be supplied to the engine body 10. If the excessively hot intake air is supplied to the engine body 10, abnormal combustion, such as a premature ignition of fuel at an unexpected timing and a knock, may occur. Moreover, since the hot intake air is low in the density, the suitable combustion torque may not be acquired when the operating state of the engine body 10 goes into the range C from the range A.

Therefore, in this embodiment, while the engine 1 operates in the range A, the ECU 100 outputs a control signal to the second pump 71 so that the intercooler coolant is supplied to the intercooler 46. That is, the intercooler coolant is supplied to the intercooler 46, even if the intake air does not pass through the supercharging side passage 40a and the non-boosted intake air is supplied to the engine body 10. Therefore, the air inside the supercharging side passage 40a is cooled by the intercooler 46 so that the temperature increase of the air inside the supercharging side passage 40*a* is prevented. Moreover, by supplying the intercooler coolant to the intercooler 46 also while the engine 1 operates in the range A, the cooling of the intake air by the intercooler 46 can be performed with a sufficient response when the operating state of the engine body 10 goes into the range C from the range A. As a result, when the operating state of the engine body 10 goes into the range C from the range A, the excessively hot intake air is prevented from being supplied to the engine body 10. Therefore, when the operating state of the engine body 10 goes into the operating range in which the boosted intake air is supplied to the engine body 10 (range C) from the operating range in which the non-boosted intake air is supplied to the engine body 10 (range A), the occurrence of abnormal combustion can be prevented.

Moreover, if the cooling of the intake air by the intercooler 46 can be performed with a sufficient response, the high-density intake air can be supplied to the engine body 10. As a result, when the operating state of the engine body 10 goes into the range C from the range A, the suitable combustion torque can be acquired as well.

In this embodiment, when the operating state of the engine body 10 is in the range C, the ECU 100 outputs a control signal to the second pump 71 so that the intercooler coolant is supplied to the intercooler 46 at a first flow rate. On the other hand, when the operating state of the engine body 10 is in the range A, the ECU 100 outputs a control signal to the second pump 71 so that the intercooler coolant is supplied to the intercooler 46 at a second flow rate less than the first flow rate. That is, even if the second flow rate is less than the first flow rate, the response of cooling of the intake air by the intercooler 46 can be improved. Moreover, although the air inside the supercharging side passage 40*a* is heated by the heat transfer from the bypass passage 47, since this amount of heat is smaller than the amount of heat by the boosting, the air inside the supercharging side passage 40*a* can be fully cooled even if the second flow rate is less than the first flow rate. Thus, when the operating state of the engine body 10 is in the range A, the power consumption for the operation of the second pump 71 can be reduced by reducing the flow rate of the intercooler coolant supplied to the intercooler 46 per unit time. Note that when the operating state of the engine body 10 is in the range A, the discharge pattern of the intercooler coolant by the second pump 71 may be a constant pattern or an intermittent pattern, as long as the flow rate of the intercooler coolant supplied to the intercooler 46 per unit time becomes the second flow rate.

Figure 11A:
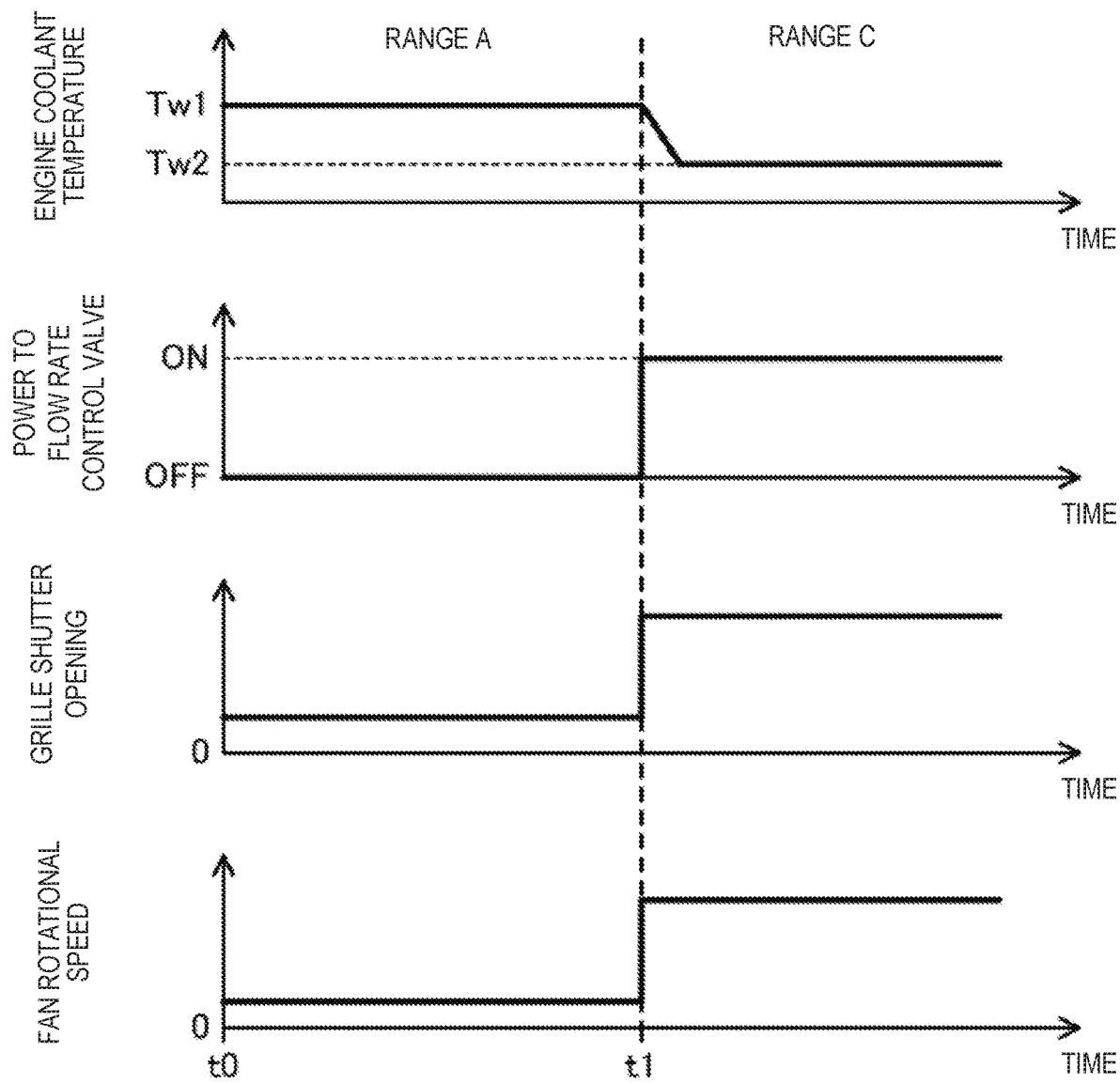
FIG. 11A is a time chart illustrating one example of a driving state of each device according to the flow of engine coolant and the flow of intercooler coolant.
Figure 11B:
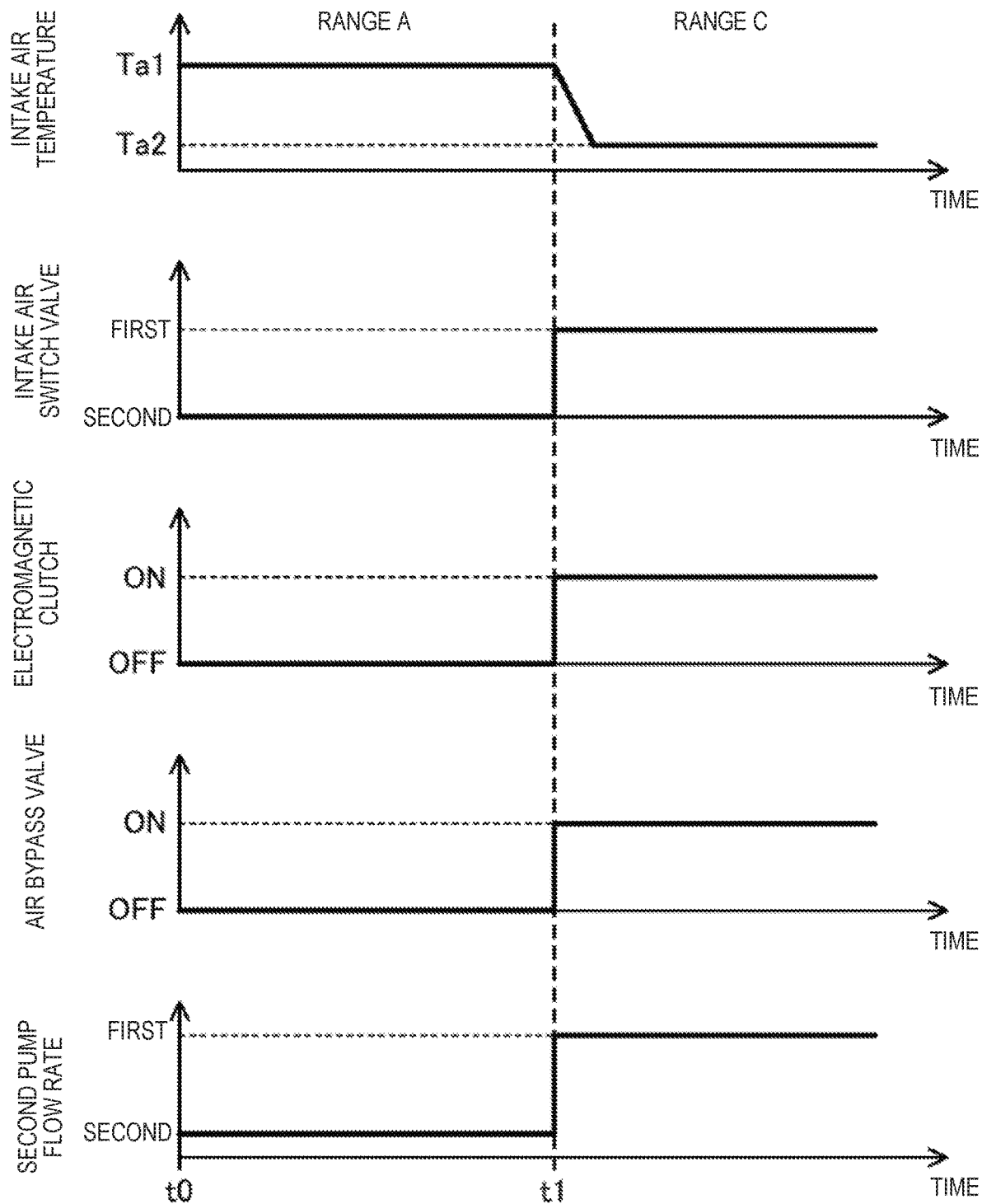
FIG. 11B is a time chart illustrating one example of a driving state of each device according to the flow of intake air.

FIGS. 11A and 11B are time charts illustrating a change in the operating state of each device when the operating state of the engine body 10 changes from the range A to the range C. Suppose that first the operating state of the engine body 10 is in the range A at a time t0. At this time, as described above, the ECU 100 operates and controls each device so that the temperature of the engine coolant becomes the first fluid temperature Tw1 (refer to FIG. 11A) and the intake air temperature becomes the first intake-air temperature Ta1 (refer to FIG. 11B).

Next, suppose that the engine load goes up and the operating state of the engine body 10 transits from the range A to the range C at a time t1. At this time, the ECU 100 operates and controls each device so that the temperature of the engine coolant becomes the second fluid temperature Tw2 and the intake air temperature becomes at or below the second intake air temperature Ta2. In detail, the ECU 100 starts supplying the power to the flow rate control valve 63. Therefore, the opening of the flow rate control valve 63 increases, and the flow rate of the engine coolant which flows through the first radiator 62 increases. Moreover, the ECU 100 increases the opening of the grille shutter 81, and increases the rotational speed of the radiator fan 82. Therefore, the temperature of the engine coolant becomes the second fluid temperature Tw2.

Moreover, the ECU 100 operates the intake air switch valve 143 so that fresh air can be taken in through the first air intake part 141. Further, while the ECU 100 connects the electromagnetic clutch 45 and fully closes the air bypass valve 48 so that the boosted intake air is supplied to the engine body 10. Moreover, the ECU 100 increases the flow rate of the second pump 71 (from the second flow rate to the first flow rate). Therefore, the intake air temperature becomes at or below the second intake air temperature Ta2.

Therefore, in this embodiment, in the first operating range (range C) in which the supercharging side passage 40*a* is at least partially opened by the electromagnetic clutch 45 and the air bypass valve 48 and the intake air boosted by the supercharger 44 is supplied to the engine body 10, the ECU 100 outputs a control signal to the second pump 71 so that the intercooler coolant is supplied to the intercooler 46, and on the other hand, also in the second operating range (range A) in which the load of the engine body 10 is below a given load, and the bypass passage 47 is opened and the supercharging side passage 40*a* is closed by the electromagnetic clutch 45 and the air bypass valve 48 so that the intake air is supplied to the engine body 10 in the non-boosted state, the ECU 100 outputs a control signal to the second pump 71 so that the intercooler coolant is supplied to the intercooler 46. Thus, since the intercooler coolant is supplied to the intercooler 46 even in the range A in which the non-boosted intake air is supplied to the engine body 10, the intake air boosted by the supercharger 44 can be cooled by the intercooler 46 with a sufficient response. Therefore, when the operating state of the engine body 10 goes into the range C from the range A, it can be prevented that the excessively hot intake air is supplied to the engine body 10. As a result, when the operating state of the engine body 10 goes into the operating range (range C) in which the boosted intake air is supplied to the engine body 10 from the operating range (range A) in which the non-boosted intake air is supplied to the engine body 10, it can be prevented that the abnormal combustion occurs.

Moreover, in this embodiment, the second pump 71 is an electric pump of which the discharging amount of the coolant increases as the supplied electric power increases, and the ECU 100 outputs a control signal to the second pump 71 so that the flow rate of the intercooler coolant supplied to the intercooler 46 per unit time in the range A becomes less than the flow rate of the intercooler coolant supplied to the intercooler 46 per unit time in the range C. Therefore, the power consumption for operating the second pump 71 can be reduced.

Moreover, in this embodiment, in the first operating range (range C), the electromagnetic clutch 45 and the air bypass valve 48 close the bypass passage 47 and open the supercharging side passage 40*a* so that the intake air boosted by the supercharger 44 is supplied to the engine body 10. That is, when the operating state of the engine body 10 is in the range C (when the load of the engine body is high), it is necessary to supply the intake air (especially, fresh air) as much as possible to the engine body 10, and to positively boost the intake air by the supercharger 44. Moreover, when the operating state of the engine body 10 is in the range C, it is required to increase the density of the intake air.

Therefore, the high response to the cooling of the intake air by the intercooler 46 is required. Therefore, when the operating state of the engine body 10 goes into the range C from the range A, the effect of reducing the occurrence of the abnormal combustion can be demonstrated more appropriately.

Moreover, in this embodiment, the temperature (first intake-air temperature Ta1) of the intake air supplied to the engine body 10 in the second operating range (range A) is higher than the temperature (second intake-air temperature Ta2) of the intake air supplied to the engine body 10 in the first operating range (range C). That is, when the operating state of the engine body 10 is in the range A, the intake air mainly passes through the bypass passage 47. At this time, since the supercharging side passage 40a is heated by the heat transfer from the bypass passage 47, the air inside the supercharging side passage 40a is also heated. In this regard, when the operating state of the engine body 10 is in the range A, it can be prevented by supplying the intercooler coolant to the intercooler 46 that the air inside the supercharging side passage 40a is heated. Therefore, when the operating state of the engine body 10 goes into the range C from the range A, the occurrence of abnormal combustion can be further reduced effectively.

Moreover, in this embodiment, the geometric compression ratio of the engine body 10 is 13:1 or higher. That is, when the geometric compression ratio of the engine body 10 is comparatively high, such as 13:1 or higher, it tends to acquire the high combustion torque, but it is easy to cause abnormal combustion. Therefore, by supplying the intercooler coolant to the intercooler 46 also when the operating state of the engine body 10 is in the range A, when the operating state of the engine body 10 goes into the range C from the range A, the effect of reducing the occurrence of the abnormal combustion can be demonstrated further appropriately.

Embodiment 2

Below, Embodiment 2 of the present disclosure is described in detail with reference to the drawings. Note that in the following description, parts common to Embodiment 1 are denoted with the same reference characters to omit the detailed description thereof.

Figure 12:
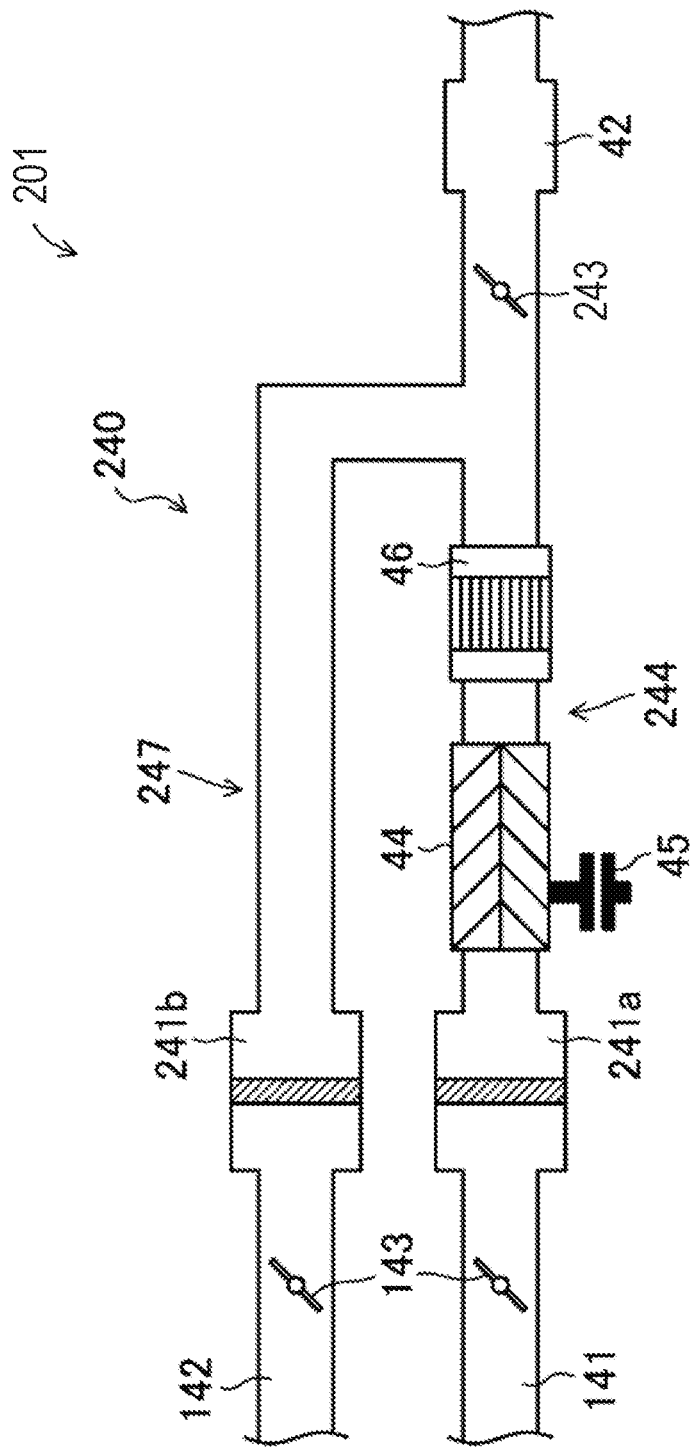
FIG. 12 is a schematic view illustrating an intake passage of an engine provided with an intake-air temperature controlling device according to an Embodiment 2.

An engine 201 according to Embodiment 2 differs from Embodiment 1 in the configuration of an intake passage 240. In Embodiment 2, as illustrated in FIG. 12, a first passage 244 where the compressor of the supercharger 44 is disposed, and a second passage 247 where the supercharger 44 is not provided are respectively formed as independent passages. Note that in FIG. 12, since the engine body 10 and a cooling system of the engine 201 have similar configurations to those of Embodiment 1, the description thereof is omitted.

In detail, as illustrated in FIG. 12, the first passage 244 extends from the first air intake part 141, and is connected to the surge tank 42. The supercharger 44 and the intercooler 46 are disposed in the first passage 244. On the other hand, the second passage 247 extends from the second air intake part 142, and is connected to the first passage 244 at a location downstream of the intercooler 46. That is, the second passage 247 communicates with the first passage 244 at a location at least downstream of the supercharger 44.

An air cleaner 241 is disposed in each of the first and second passages 244 and 247. In detail, a first air cleaner 241a is disposed between the first air intake part 141 and the supercharger 44 in the first passage 244. A second air cleaner 241b is disposed in the second passage 247.

A ratio of an amount of intake air passing through the first passage 244 to an amount of intake air passing through the second passage 247 is adjusted by an intake air switching valve 243.

In Embodiment 2, when the operating state of the engine body 10 is in the range A, the ECU 100 opens the second passage 247 and closes the first passage 244 so that intake air is supplied to the engine body in the non-boosted state. Moreover, when the operating state of the engine body 10 is in the range C, the ECU 100 at least partially opens the first passage 244 so that intake air boosted by the supercharger 44 is supplied to the engine body 10. Therefore, also in Embodiment 2, when the operating state of the engine body 10 goes into the range C from the range A, i.e., when the operating state of the engine 201 becomes an operating range in which the boosted intake air is supplied to the engine body 10 from the operating range in which the non-boosted intake air is supplied to the engine body 10, the high response to the cooling of the intake air by the intercooler 46 is required.

Therefore, also in Embodiment 2, when the operating state of the engine body 10 is in the range A, the ECU 100 outputs a control signal to the second pump so that the intercooler coolant is supplied to the intercooler 46. Thus, the configuration of Embodiment 2 can prevent that abnormal combustion occurs, when the operating state of the engine body 10 goes into the operating range (range C) in which the boosted intake air is supplied to the engine body 10 from the operating range (range A) in which the non-boosted intake air is supplied to the engine body 10.

Note that in Embodiment 2, when the operating state of the engine body 10 is in the range B, a recirculation of intake air cannot be performed. For this reason, it is necessary to enable the intake air at the first intake-air temperature Ta1 to be supplied to the engine body 10, for example, by making the operation of the devices of the first cooling path, such as the flow rate control valve and the grille shutter, the same as that when the operating state of the engine body 10 is in the range A.

Other Embodiments

The technology disclosed herein is not limited to the above embodiment, and it may be substituted without departing from the scope of the claims.

For example, in the above embodiment, the flow rate (second flow rate) of the intercooler coolant supplied to the intercooler 46 per unit time when the operating state of the engine body 10 is in the range A is less than the flow rate (first flow rate) of the intercooler coolant supplied to the intercooler 46 per unit time when the operating state of the engine body 10 is in the range C. Without being limited to this configuration, the flow rate of the intercooler coolant supplied to the intercooler 46 per unit time may be set as the first flow rate also when the operating state of the engine body 10 is in the range A.

The above embodiments are merely an illustration and the scope of the present disclosure is not to be interpreted in a limited sense. The scope of the present disclosure is defined by the appended claims, and all of the modifications and changes belonging to the equivalents of the appended claims fall within the scope of the present disclosure.

The technology disclosed herein is useful for the intake-air temperature controlling device for the engine with the supercharger which includes the engine body, the intake passage connected to the engine body, and the mechanical supercharger provided to the intake passage.

DESCRIPTION OF REFERENCE CHARACTERS

1 Engine
10 Engine Body
40 Intake Passage
44 Mechanical Supercharger
44a Supercharging Side Passage (First Passage)
45 Electromagnetic Clutch (Intake Air Flow Rate Adjuster)
46 Intercooler
47 Bypass Passage (Second Passage)
48 Air Bypass Valve (Intake Air Flow Rate Adjuster)
71 Second Pump
100 ECU (Controller)
244 First Passage
247 Second Passage
243 Intake Air Switch Valve (Intake Air Flow Rate Adjuster)

What is claimed is:

1. An intake-air temperature controlling device, comprising:
    an engine body;
    an intake passage connected to the engine body;
    a supercharger provided to the intake passage;
    a first passage provided to the intake passage and including a compressor of the supercharger;
    a second passage provided to the intake passage, communicating with the first passage at a location at least downstream of the supercharger, and not provided with the supercharger;
    an intake air flow rate adjuster configured to adjust a ratio of an amount of intake air passing through the first passage to an amount of intake air passing through the second passage;
    an intercooler provided to the first passage at a location immediately downstream of the supercharger;
    a pump configured to supply coolant to the intercooler; and
    a controller comprised of circuitry and configured to control the pump and the intake air flow rate adjuster,
    wherein the controller outputs a control signal to the pump so that the coolant is supplied to the intercooler in a first operating range in which the intake air flow rate adjuster at least partially opens the first passage to supply the intake air boosted by the supercharger to the engine body, and outputs a control signal to the pump so that the coolant is supplied to the intercooler also in a second operating range in which a load of the engine body is below a given load, and the intake air flow rate adjuster opens the second passage and closes the first passage to supply the intake air to the engine body in a non-boosted state, wherein the second passage is a bypass passage connecting a part of the first passage upstream of the supercharger and a part of the first passage downstream of the intercooler, and wherein a temperature of the intake air supplied to the engine body in the second operating range is higher than a temperature of the intake air supplied to the engine body in the first operating range.

2. The intake-air temperature controlling device of claim 1,
    wherein the pump is an electric pump configured to increase a discharging amount of the coolant as supplied electric power increases, and
    wherein the controller outputs a control signal to the pump so that a flow rate of the coolant supplied to the intercooler per unit time in the second operating range becomes less than a flow rate of the coolant supplied to the intercooler per unit time in the first operating range.

3. The intake-air temperature controlling device of claim 1,
    wherein the first operating range is an operating range in which the load of the engine body is higher than the given load, and
    wherein the intake air flow rate adjuster closes the second passage and opens the first passage in the first operating range to supply the intake air boosted by the supercharger to the engine body.

4. The intake-air temperature controlling device of claim 3, wherein a combustion mode of the engine body when the load of the engine body is higher than the given load is a combined mode of spark ignition (SI) combustion in which jump-spark ignition of a mixture gas comprised of fuel and the intake air is carried out by an ignition plug and compression ignition (CI) combustion in which a compression self-ignition of the mixture gas comprised of fuel and the intake air is carried out.

5. The intake-air temperature controlling device of claim 1, wherein a geometric compression ratio of the engine body is 13:1 or higher.

* * * * *